United States Patent [19]
Ishii

[11] Patent Number: 5,957,229
[45] Date of Patent: *Sep. 28, 1999

[54] AXLE DRIVING APPARATUS

[75] Inventor: Norihiro Ishii, Amagasaki, Japan

[73] Assignee: Kanzaki Kokyukoki Mfg. Co., Ltd., Japan

[ * ] Notice: This patent is subject to a terminal disclaimer.

[21] Appl. No.: 08/876,319

[22] Filed: Jun. 16, 1997

Related U.S. Application Data

[63] Continuation of application No. 08/447,846, May 23, 1995.

[30]  Foreign Application Priority Data

| May 31, 1994 | [JP] | Japan | 6-118737 |
| May 23, 1994 | [JP] | Japan | 6-108520 |
| Jun. 1, 1994 | [JP] | Japan | 6-119841 |
| Jun. 1, 1994 | [JP] | Japan | 6-120247 |

[51] Int. Cl.⁶ .................................................. B62D 11/02
[52] U.S. Cl. ..................... 180/6.48; 60/484; 180/19.1; 180/308
[58] Field of Search ........................... 180/19.1, 19.2, 180/19.3, 6.2, 6.48, 305, 307, 308; 60/484, 485

[56]  References Cited

U.S. PATENT DOCUMENTS

| 3,279,172 | 10/1966 | Kudo et al. . |
| 4,116,292 | 9/1978 | Todeschini ...................... 180/6.48 |
| 4,174,013 | 11/1979 | Yago . |
| 4,809,796 | 3/1989 | Yamaoka et al. . |
| 4,917,200 | 4/1990 | Lucius . |
| 4,920,733 | 5/1990 | Berrios . |
| 4,967,543 | 11/1990 | Scag et al. . |
| 4,991,382 | 2/1991 | Scag . |
| 5,077,959 | 1/1992 | Wenzel . |
| 5,078,222 | 1/1992 | Hauser et al. . |
| 5,127,215 | 7/1992 | Wenzel . |
| 5,137,100 | 8/1992 | Scott . |
| 5,247,784 | 9/1993 | Kitamura et al. ..................... 180/6.48 |

FOREIGN PATENT DOCUMENTS

| 2-135765 | 11/1990 | Japan . |
| 40 3276877 | 12/1991 | Japan . |

*Primary Examiner*—Anne Marie Boehler
*Attorney, Agent, or Firm*—Sterne, Kessler, Goldstein & Fox P.L.L.C.

[57]  ABSTRACT

An axle driving apparatus, which contains two separately driven hydrostatic transmissions (HSTs) in a single housing, is made compact to improve the running operational efficiency of a working machine. In particular, power from a prime mover is transmitted to an input pulley so that the power is speed-changed by the two HSTs to drive left and right axles through left and right power transmitting means. The HSTs, power transmitting means and the axles are disposed substantially symmetrically laterally in the housing. The housing comprises parts coupled with each other such that joints between the parts are disposed in horizontal planes substantially parallel to the axes of rotation of the axles.

22 Claims, 39 Drawing Sheets

AXLE DRIVING APPARATUS

This application is a continuation division of application Ser. No. 08/447,846, filed May 23, 1995, pending.

BACKGROUND OF THE INVENTION

1. Field of the Invention

The present invention relates to an axle driving apparatus using a hydrostatic transmission for individually driving left and right axles. The hydrostatic transmission includes a pair of hydraulic pumps and a pair of hydraulic motors.

2. Related Art

A driver of a vehicle during use needs to have the ability to change the traveling direction of the vehicle, for example, from straight forward travel to a gentle turn, a sharp turn and zero turn. To accomplish this, often a pair of high performance hydrostatic transmissions are used. Such hydrostatic transmissions are individually connected to left and right drive wheels of the vehicle.

U.S. Pat. Nos. 4,920,733 and 4,967,543 disclose examples of such, whereby a pair of variable displacement hydraulic pumps and a pair of fixed displacement hydraulic motors are arranged on a car body. The pair of hydraulic pumps are connected to a prime mover. The pair of hydraulic motors are individually connected to the left and right drive wheels. One of the hydraulic pumps is fluidly coupled with one of the hydraulic motors through a pipe. The other hydraulic pump is also fluidly connected to the other hydraulic motor through a pipe. This type of arrangement requires the use of many pipes, which lowers assembly and production efficiency.

An improvement to the technology discussed above is disclosed in U.S. Pat. Nos. 4,809,796, which has the same assignee as the present application and 5,127,215. These patents disclose using a pair of commercial hydraulic transmissions having an integrated hydraulic pump and hydraulic motor disposed on a transaxle mounted to the left and right sides of a vehicle. The transmissions are coupled in a driving manner with the axles to constitute an axle driving apparatus. Because two commercial hydrostatic transmissions must be used, the manufacturing costs are high.

To overcome the problems discussed above, Japanese Utility Model Laid-Open Gazette No. Hei 2-135,765, also having the same assignee as the present application, discloses an axle driving apparatus which has a pair of variable displacement pumps and a pair of fixed displacement motors in a single housing. The pair of motors are individually connected to the left and right axles, respectively. FIG. 1 of this Japanese document shows the pair of hydraulic pumps and hydraulic motors mounted on a center section disposed in the housing.

The disclosure of this Japanese document relates to controlling the driving of the left and right hydraulic motors when the vehicle is turning. However, the construction disclosed in this document is inadequate in that a commercial device cannot be realized. For example, the construction of the housing, the power transmission routes from the left and right hydraulic motors to the respective axles, the construction of a closed circuit for fluidly connecting each hydraulic pump with each hydraulic motor, and the positioning of a charge pump for supplying operating oil to the closed circuit are all inadequate.

The drive control of the left and right hydraulic motors of this Japanese document is constructed with turn levers on the sides of the vehicle. When the turn lever on a particular side is lightly gripped, the hydraulic motor at that side is stopped so as to gently turn the vehicle. When the lever is tightly gripped, the axle at that side is braked hard to sharply turn the vehicle. In contrast to the device disclosed in the Japanese document, the present application generally discloses a pair of left and right hydrostatic transmissions to eliminate having to turn a vehicle by controlling the output rotation at one side of the vehicle.

Finally, the vehicle disclosed in this Japanese document is designed to travel forward when both of the steering levers are released. However, even when an operator leaves the vehicle unattended, the vehicle may continue to travel, which is extremely dangerous.

SUMMARY OF THE INVENTION

A primary object of the present invention is to solve the problems identified with Japanese Utility Model Laid-Open Gazette No. Hei 2-135,765.

Another object of the present invention is to house, in one housing, a pair of variable displacement hydraulic pumps and a pair of fixed displacement hydraulic motor and to individually connect the pair of hydraulic motors to left and right axles, respectively to produce an axle driving apparatus, reduce manufacturing costs, improve assembly efficiency, and reduce the size of the axle driving apparatus for use in a limited space in a vehicle, especially a vehicle that has an apparatus mounted thereon.

Another object of the present invention is to make the vehicle turn by a simple procedure.

A further object of the present invention is to have the vehicle immediately stop when an operator leaves the vehicle unattended.

These and other objects of the invention will become more apparent from the detailed description which follows.

One embodiment of the invention includes an axle driving apparatus including a housing, first and second axles laterally disposed in the housing, and a first hydrostatic transmission disposed within the housing. The first hydrostatic transmission includes a first hydraulic pump and a first hydraulic motor having a first motor shaft. In addition, a second hydrostatic transmission is disposed in the housing. The second hydrostatic transmission includes a second hydraulic pump and a second hydraulic motor having a second motor shaft. A power input means having a substantially vertical axis of rotation supplies power from a prime mover to the first and the second hydraulic pumps. A first power transmitting means disposed in the housing is for transmitting power outputted from the first hydrostatic transmission to the first axle and includes: a first counter shaft disposed between the first motor shaft and the first axle, and a first gear train for coupling in a driving manner the first motor shaft and the counter shaft with the first axle. A second power transmitting means disposed in the housing is for transmitting power outputted from the second hydrostatic transmission to the second axle and includes: a second counter shaft disposed between the second motor shaft and the second axle, and a second gear train for coupling in a driving manner the second motor shaft and the second counter shaft with the second axle.

More particularly, the first hydrostatic transmission includes a first hydraulic pump having a first pump shaft and a first hydraulic motor disposed in the housing. A first center section is disposed within the housing at a lateral side thereof and is provided with a first closed fluid circuit for fluidly coupling the first hydraulic pump and the first hydraulic motor. The first hydraulic pump and the first hydraulic motor are provided on the first center section. The second hydrostatic transmission includes a second hydraulic pump having a second pump shaft and second hydraulic motor. A second center section is disposed within the housing at another lateral side thereof and is provided with a second closed fluid circuit for fluidly coupling the second hydraulic pump with the second hydraulic motor. The second hydraulic pump and second hydraulic motor are provided on the second center section.

In another embodiment of the invention, a center section is disposed in the housing and is provided with a first closed fluid circuit for fluidly coupling the first hydraulic pump with the first hydraulic motor and a second closed fluid circuit for fluidly coupling the second hydraulic pump with the second hydraulic motor. The first hydraulic pump and first hydraulic motor are provided at a lateral side of the center section. The second hydraulic pump and hydraulic motor are provided at another lateral side of the center section.

Another embodiment of the invention relates to a steering unit for a vehicle. The vehicle includes first and second axles, and first and second hydraulic transmissions drivingly coupled with the first and second axles. Each of the transmissions include a speed change lever for steplessly outputting the output rotation thereof in forward travel, neutral and backward travel directions. A steering operation means is disposed on the vehicle. A control linkage means is provided for linking with the steering operation means and with each of the speed change levers. The control linkage means includes means for biasing each of the speed change levers toward the forward travel, maximum output direction when the steering operation means is released. A deadman means is disposed on the vehicle. An interlock mechanism is provided for linking the deadman means with the control linkage means. The interlock mechanism acts to position each of the speed change levers simultaneously in the neutral position when the deadman means is released.

DETAILED DESCRIPTION OF PREFERRED EMBODIMENTS

Figure 1:
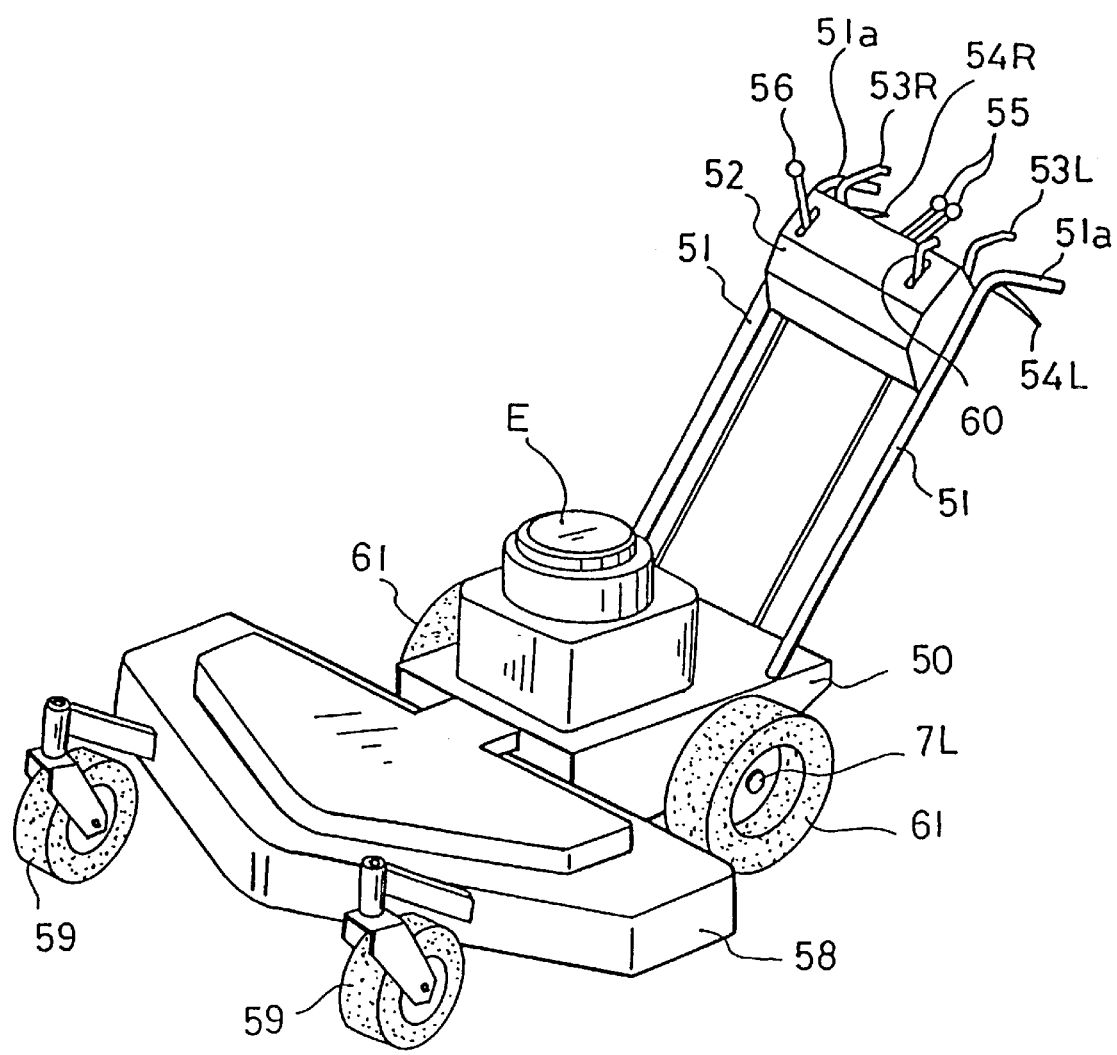
FIG. 1 is a perspective view of a walk behind lawn mower having the axle driving apparatus of the present invention mounted thereon.

The following is a discussion of the preferred embodiments of the present invention. Like reference numerals are used throughout the discussion to represent like elements.

FIG. 1 shows a walk behind type lawn mower as an example of a vehicle having an axle driving apparatus of the present invention mounted thereon. The walk behind type mower shown in FIG. 1 has a body frame 50. Two handles 51 project in a slanting rearward direction from a rear of body frame 50. An operating box 52 is interposed between the upper end portions of handles 51. On operating box 52 is provided a pair of speed control levers 55 for adjusting the speed of left and right axles 7L and 7R. An acceleration lever 56 for adjusting the number of rotations of engine E, and a bypass lever 60 for freely rotating axles 7L and 7R are also provided on operating box 52. Above grips 51a of left and right handles 51 are disposed deadman levers 53L and 53R for controlling operation and non-operation of a parking brake (discussed below) and further for controlling drive and non-drive of axles 7L and 7R, respectively. Below grips 51a of left and right handles 51 are disposed steering levers 54L and 54R for changing the rotational direction of the axle between forward and backward. Left and right drive wheels 61 are mounted on axles 7L and 7R, respectively.

Figure 2:
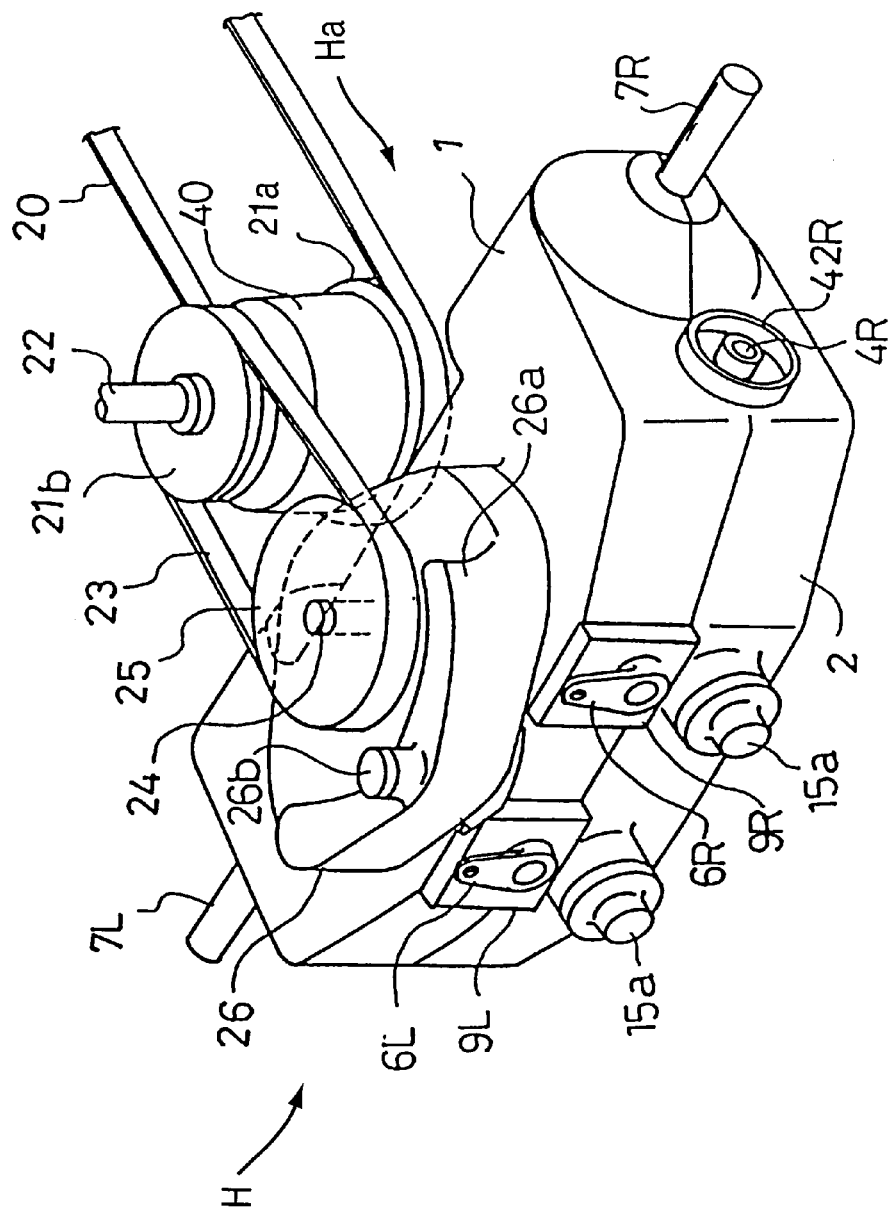
FIG. 2 is a perspective view of a first embodiment of the axle driving apparatus of the present invention.
Figure 3:
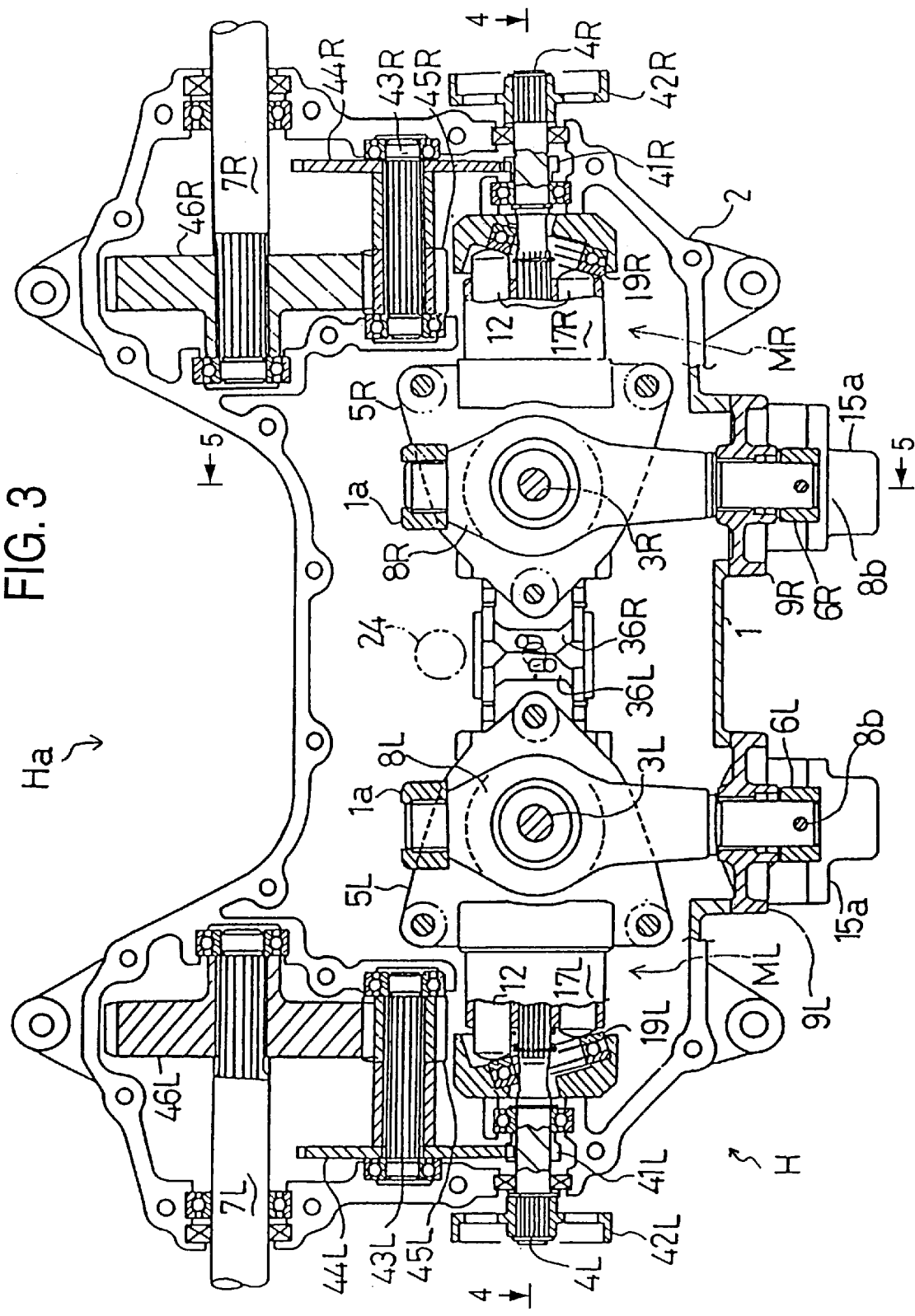
FIG. 3 is a plan view in partial cross section of the axle driving apparatus of FIG. 2, from which a middle part of the housing has been removed.

A mower deck 58 is mounted on the front end of body frame 50. Caster wheels 59 are disposed at a front end of mower deck 58. Vertical engine E is substantially centered on an upper surface of body frame 50 and an axle driving apparatus of the present invention is mounted rearwardly thereof. As seen in FIG. 2, engine E or prime mover has a downwardly projecting output or crank shaft 22. At the lower end of crank shaft 22 are fixed double pulleys 21a and 21b. Pulley 21a contains an electromagnetic clutch 40. A belt 20 is wound around pulley 21a to drive a cutting blade contained in mower deck 58. A belt 23 is wound on pulley 21b so as to transmit power to an input pulley 25 on an input shaft 24 projecting vertically upwardly from a housing H of the axle driving apparatus of the present invention. Power is transmitted to the axle driving apparatus from engine E so that axles 7L and 7R are driven individually to rotatably drive left and right drive wheels 61, thereby driving the vehicle.

A recess Ha is formed in the center of the front portion of housing H. Crank shaft 22 and double pulleys 21a and 21b are disposed in recess Ha. This construction positions engine E in a lower position so as to lower the center of gravity and to position pulleys 21a and 21b near axles 7L and 7R, respectively. Housing H is constructed to mutually join an upper housing part 26, a middle housing part 1 and a lower housing part 2 through peripheral flat surfaces thereon. A first joint plane is defined by the joint between upper housing part 26 and middle housing part 1. A second joint plane is define by the joint between middle housing part 1 and lower housing part 2. The two joint planes for housing H are positioned horizontally when the axle driving apparatus is mounted on the vehicle. The joint planes are substantially parallel to the axis of rotation of axles 7L and 7R.

With reference to FIGS. 3 to 6, an internal construction of housing H of the first embodiment of the present invention will be disclosed. In a first portion of housing H comprising middle housing part 1 and lower housing part 2, various transmissions for driving axles 7L and 7R are generally symmetrically arranged along a longitudinal axis of the housing. A first left center section 5L and a second right center section 5R are arranged substantially in parallel to the longitudinal axis of axles 7L and 7R. Center sections 5L and 5R are stably fixed in position in middle housing part 1 by three bolts.

Figure 4:
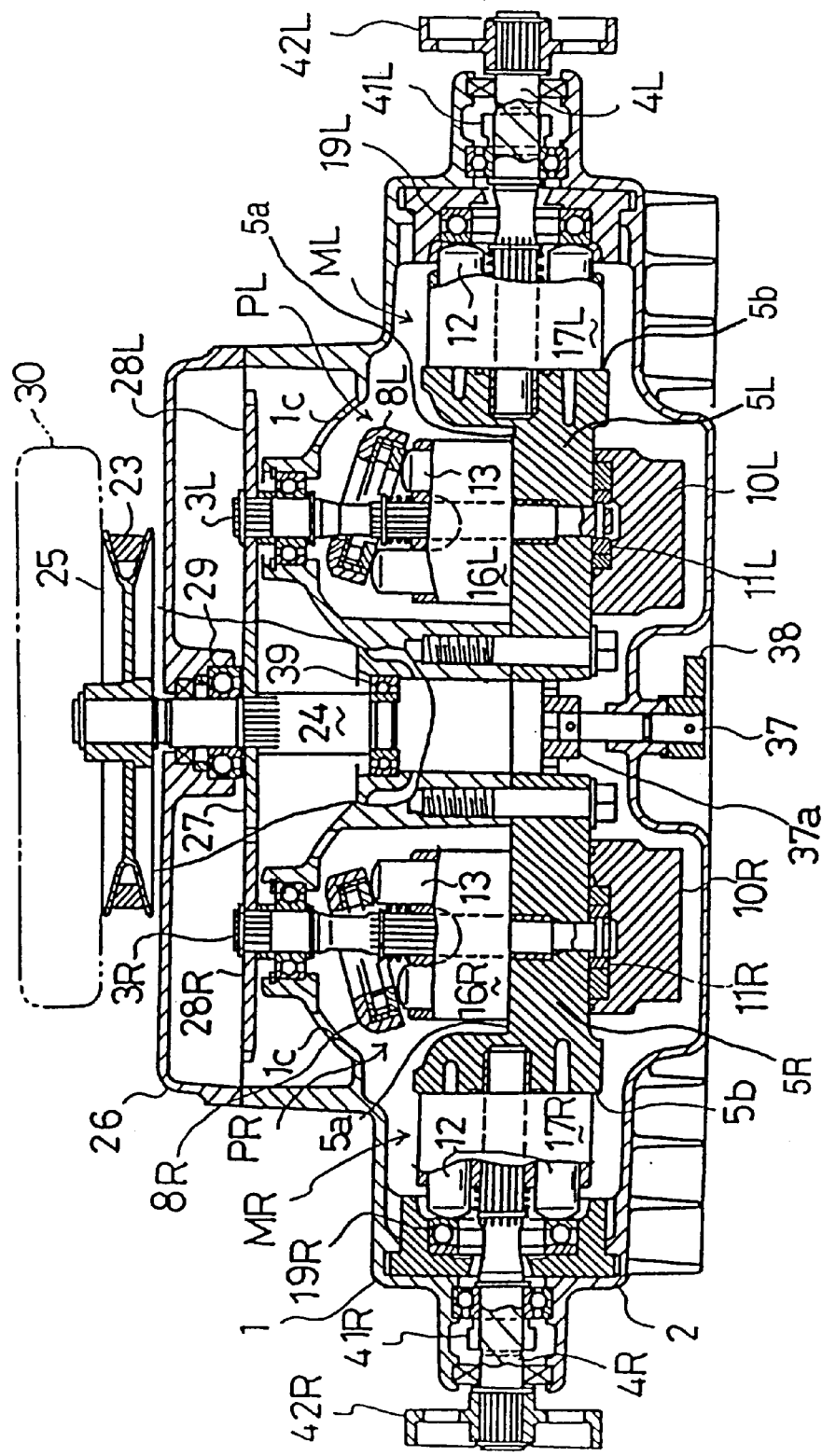
FIG. 4 is a cross sectional view taken along line 4—4 in FIG. 3.

As best seen in FIG. 4, transmission gears 27, 28L and 28R are housed in a second portion of housing H which comprises upper housing part 26 and middle housing part 1.

Transmission gear 27 engages with input shaft 24. An upper portion of input shaft 24 is supported by an upper wall of upper housing part 26 by a bearing 29. A lower portion of input shaft 24 is vertically and rotatably supported in a bearing 39 in a partition in middle housing part 1. Input pulley 25 engages with the upper end of input shaft 24 that outwardly projects from upper housing part 26. Left and right transmission gears 28L and 28R, which are engageable with transmission gear 27, are engaged with a first pump shaft 3L and a second pump shaft 3R so as to constitute lateral gear trains for transmitting power to a first hydraulic pump PL and a second hydraulic pump PR, respectively. Partitions in middle housing part 1 support the upper portions of pump shafts 3L and 3R through bearings.

The gear trains for connecting pump shafts 3L and 3R with input shaft 24 in an interlocking manner are contained in housing H, where the gear trains can be protected and lubrication is always available. Furthermore, power can be reliably transmitted and noise can be prevented. Also, because hydraulic pumps PL and PR are simultaneously driven by one input pulley 25, there is no rotational difference between left and right axles 7L and 7R. As a result, forward travelling stability is improved, only a single input pulley 25 is needed, and the power transmission series from engine E to the axle driving apparatus can be compactly arranged.

Figure 5:
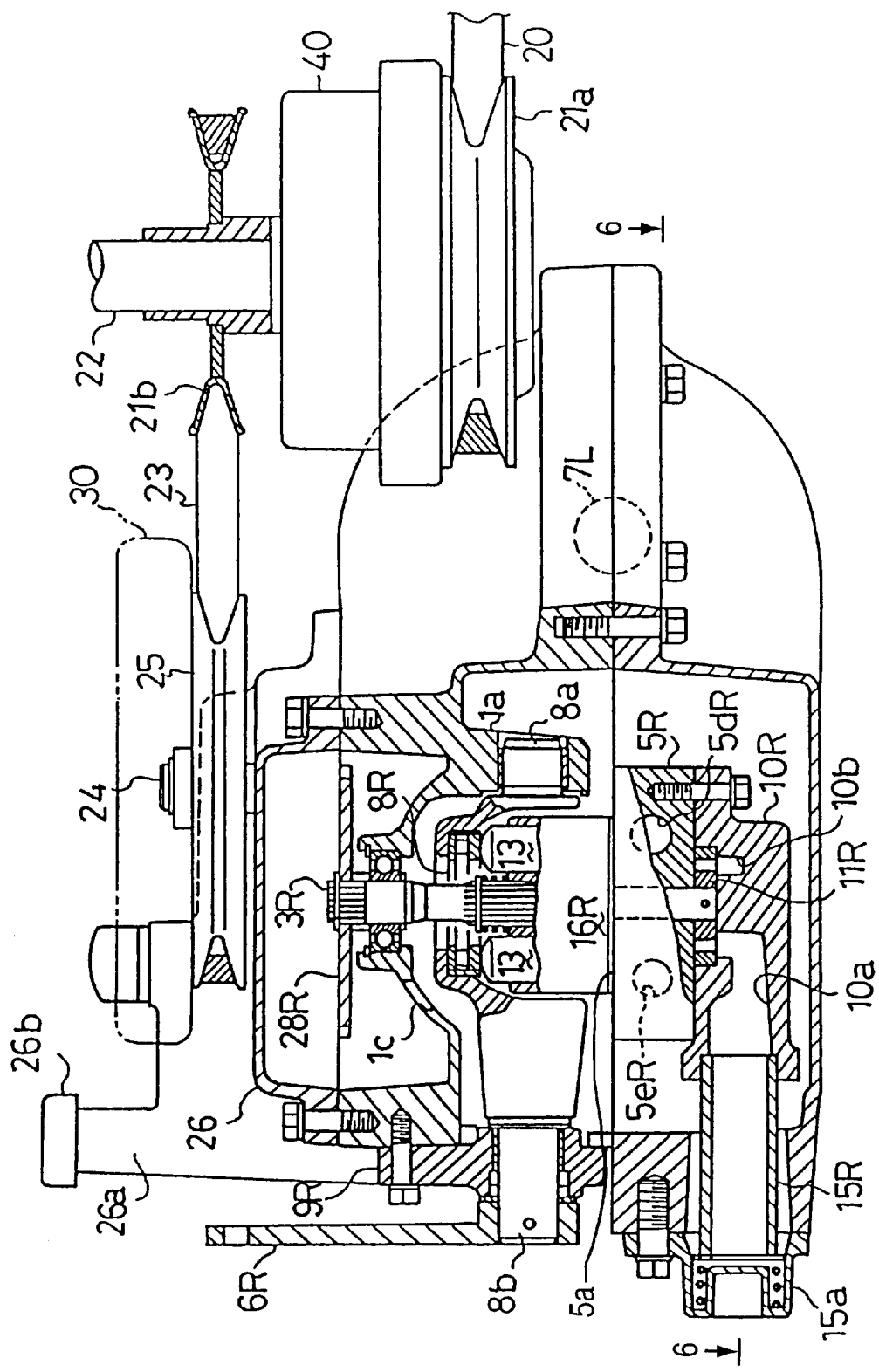
FIG. 5 is a cross sectional view taken along line 5—5 in FIG. 3.

As best seen in FIG. 5, an oil tank 26a is formed by enlarged front portion of an upper wall of upper housing part 26. Oil tank 26a communicates with an interior of the second portion of housing H. Expansion of oil stored in housing H into oil tank 26a is possible due to an air breather 26b. The first portion and second portion of housing H can be in fluid (oil) communication with each other. Air remaining in hydraulic pumps PL and PR and hydraulic motors ML and MR is mixed with the oil when the hydraulic pumps PL and PR and hydraulic motors ML and MR are driven. These air bubbles float into oil tank 26a and collect in the second portion of housing H so that the first portion of housing H is filled only by oil.

Center sections 5L and 5R are each formed in a substantially L-like shape when viewed from the rear of the vehicle of FIG. 1. A pump mounting surface 5a is formed on the horizontal upper surface of each center section 5L and 5R. Motor mounting surface 5b is formed on the outside vertical surface of each center section 5L and 5R. Cylinder blocks 16L and 16R, for hydraulic pumps PL and PR, are vertically and rotatably disposed on pump mounting surfaces 5a and on motor mounting surfaces 5b. Cylinder blocks 17L and 17R for hydraulic motors ML and MR are horizontally and rotatably disposed on surfaces 5b. A first hydrostatic transmission comprised of a combination of a hydraulic pump PL and hydraulic motor ML and a second hydraulic transmission comprised of a combination of a hydraulic pump PR and a hydraulic motor MR are disposed in housing H side by side.

Accordingly, when the axle driving apparatus is viewed from a lateral side as in FIG. 5, each respective set of hydraulic pumps PL and PR and hydraulic motors ML and MR are disposed such that cylinder blocks 16L and 17L and cylinder blocks 16R and 17R are mutually overlapped. In this first embodiment of the present invention, substantially the entire cylinder blocks mutually overlap. However, it is within the scope of the invention to have only parts of the cylinder blocks mutually overlap.

Hydraulic pumps PL and PR are variable displacement hydraulic pumps of the axial piston type and are each formed of similar parts. In particular, each hydraulic pump PL and PR includes a plurality of cylinder bores in the respective cylinder blocks 16L and 16R. A plurality of pistons 13 are reciprocally fitted into the cylinder bores. The heads of pistons 13 abut against a lower surface of movable swash plates 8L and 8R. The longitudinal axis of pump shafts 3L and 3R are aligned with the axes of rotation of cylinder blocks 16L and 16R.

Movable swash plates 8L and 8R, as shown in FIG. 4, each include: (1) shaft 8a (FIG. 5) rearwardly projecting from one side surface thereof that is rotatably supported to a leg 1a which projects downwardly from the upper, inner surface of middle housing part 1; and (2) a shaft 8b which projects forwardly from the other side surface of swash plates 8L and 8R that is rotatably supported to support plates 9L (FIG. 3) and 9R, which are attached to the outer surfaces of middle housing part 1. Speed change levers 6L and 6R are fixed to the ends of shafts 8b that are outside housing H, and are connected with steering levers 54L and 54R (FIGS. 38–40) through wires or the like, respectively. Levers 54L and 54R are operated to individually slantingly operate movable swash plates 8L and 8R from a neutral position so as to change the discharge amount and discharge direction of oil from hydraulic pumps PL and PR, respectively.

Hydraulic motors ML and MR are fixed displacement hydraulic motors of the axial piston type and are each comprised of similar parts In particular, each hydraulic motor ML and MR comprises a plurality of cylindrical bores in cylinder blocks 17L and 17R. A plurality of pistons 12 are reciprocally fitted in each of the cylindrical bores through the use of biasing springs. The heads of pistons 12 abut against thrust bearings held in a slanted position by fixed swash plates 19L and 19R. Fixed swash plates 19L and 19R are fixedly sandwiched between middle housing part 1 and lower housing part 2. A first motor shaft 4L and a second motor shaft 4R are aligned with the axes of rotation of cylinder blocks 17L and 17R.

Center sections 5L and 5R include kidney ports (not shown in FIG. 5) which are open at pump mounting surfaces 5a and which communicate with the intake ports and discharge ports of cylinder blocks 16L and 16R. Kidney ports (not shown in FIG. 5) are open at motor mounting surfaces 5b and communicate with intake ports and discharge ports of cylinder blocks 17L and 17R. Within center section 5R are a pair of oil passages 5dR and 5eR for mutually connecting kidney ports at pump mounting surface 5a and kidney ports at motor mounting surface 5b, thereby constituting a closed circuit for lubricating operating oil between hydraulic pump PR and hydraulic motor MR. Center section 5L is similar to center section 5R in that it includes a pair of oil passages 5dL and 5eL for mutually connecting kidney port 5f at pump mounting surface 5a and kidney port 5g at motor mounting surface 5b, thereby constituting a closed circuit for lubricating the operating oil between hydraulic pump PL and hydraulic motor ML.

The operating oil discharged from hydraulic pumps PL and PR by rotation of cylinder blocks 16L and 16R flows into the closed circuits in center sections 5L and 5R and is received by cylinder blocks 17L and 17R of hydraulic motors ML and MR, thereby being converted into torque of cylinder blocks 17L and 17R, respectively. The torque generated by hydraulic motors ML and MR is changed corresponding to the degree of slantwise rotation of movable swash plates 8L and 8R of hydraulic pumps PL and PR, respectively. The hydrostatic transmissions are disposed on center sections 5L and 5R so as to be juxtaposed laterally in housing H.

Check valves 31L and 32L and check valves 31R and 32R are horizontally interposed at open ends of oil passages 5dL, 5eL, 5dR and. 5eR for supplying operating oil. The inlet ports of check valves 31L and 32L are connected to an operating oil supply passage 5c open at the bottom surface of pump mounting surface 5a into a pump opposite to center section 5L. The inlet ports of check valves 31R and 32R are connected to an operating oil supply passage 5c open at the bottom surface of center section 5R opposite to pump mounting surface 5a.

Charge pumps, 11L and 11R, are provided at the bottom surface of pump mounting surface 5a of center sections 5L and 5R, respectively. The lower portion of pump shafts 3L and 3R perforate center sections 5L and 5R. Charge pumps 11L and 11R are connected to the lower ends of pump shafts 3L and 3R, respectively. Pump casings 10L and 10R house charge pumps 11L and 11R therein. Pump casings 10L and 10R are provided with intake-side oil passages 10a and discharge-side oil passages 10b. Intake-side oil passage 10a communicates with the interior of filters 15L and 15R so as to filter oil in the first portion of housing H that is to be taken in by charge pumps 11L and 11R. At the discharge-side oil passages 10b are relief valves (not shown) to adjust discharge oil to a predetermined oil pressure. Oil passage 10b communicates with operating oil supply passage 5c in center sections 5L and 5R.

Pressurized oil discharged from charge pump 11L, driven by pump shaft 3L, flows from oil passage 10b to operating oil supply passage 5c in center section 5L. When the pressurized oil reaches the inlet ports of check valves 31L and 32L, the low pressure side check valve among oil passages 5dL and 5eL is opened, whereby oil is drawn into the closed circuit. Similarly, the pressurized oil discharged from charge pump 11R, driven by pump shaft 3R, flows from the oil passage 10b to operating oil supply passage 5c in center section 5R. When the pressurized oil reaches the inlet ports of check valves 31R and 32R, the low pressure side check valve among oil passages 5dR and 5eR is opened, whereby oil is drawn into the closed circuit. Thus, the oil in the housing is adapted to be simultaneously supplied to the closed circuits by charge pumps 11L and 11R, which are a part of left and right center sections 5L and 5R, respectively.

Filters 15L and 15R are cylindrical and are inserted into housing H through an opening formed in the side wall of lower housing part 2. The extreme end of filters 15L and 15R are adapted to be inserted into intake-side oil passages 10a through openings on the side surface of pump casings 10L and 10R. Covers 15a which close the openings are removed when filters 15L and 15R are changed or during a maintenance inspection. Accordingly, filters 15L and 15R are easily removable or insertable from the exterior of housing H.

Figure 6:
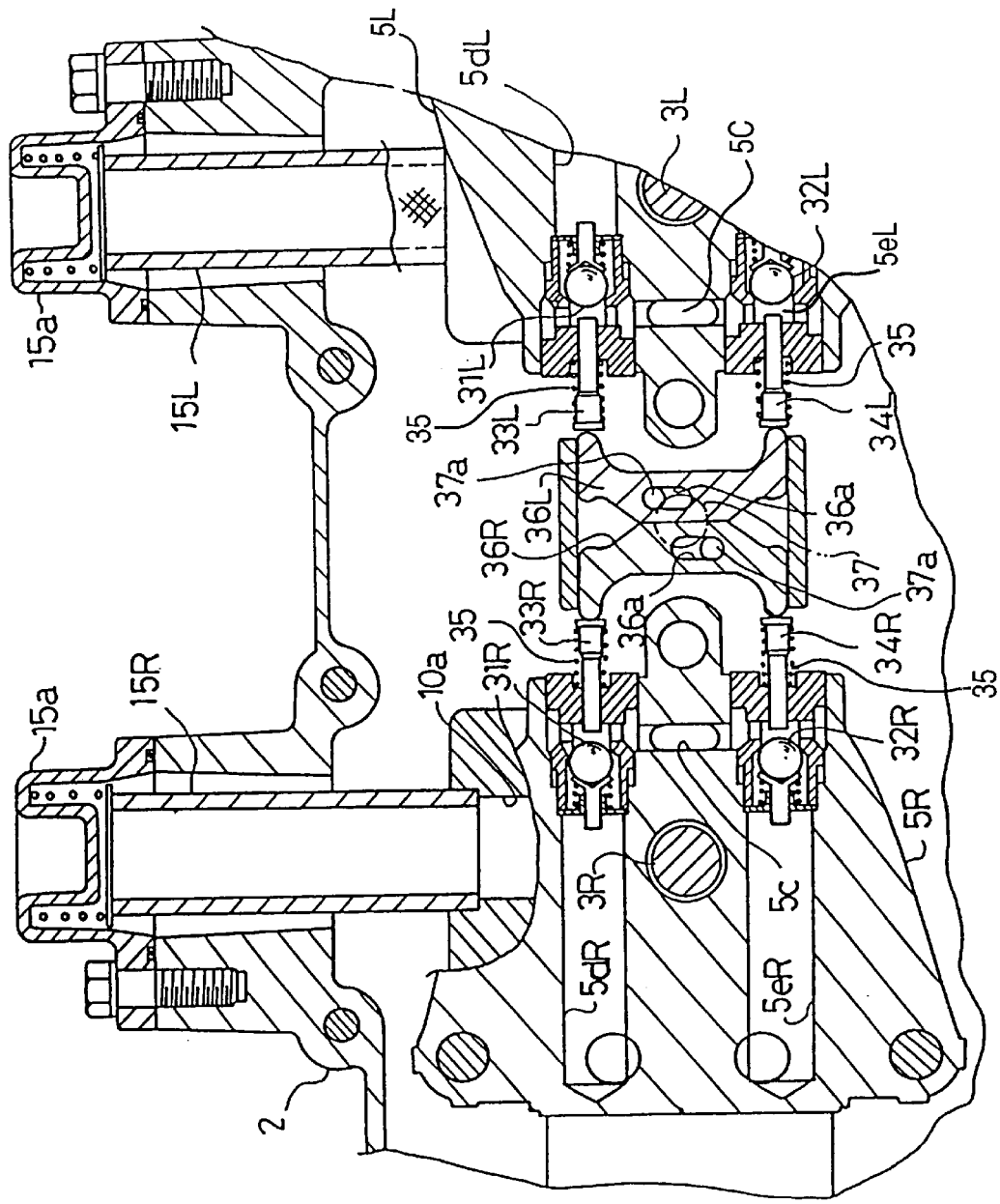
FIG. 6 is a cross sectional view taken along line 6—6 in FIG. 5.
Figure 7:
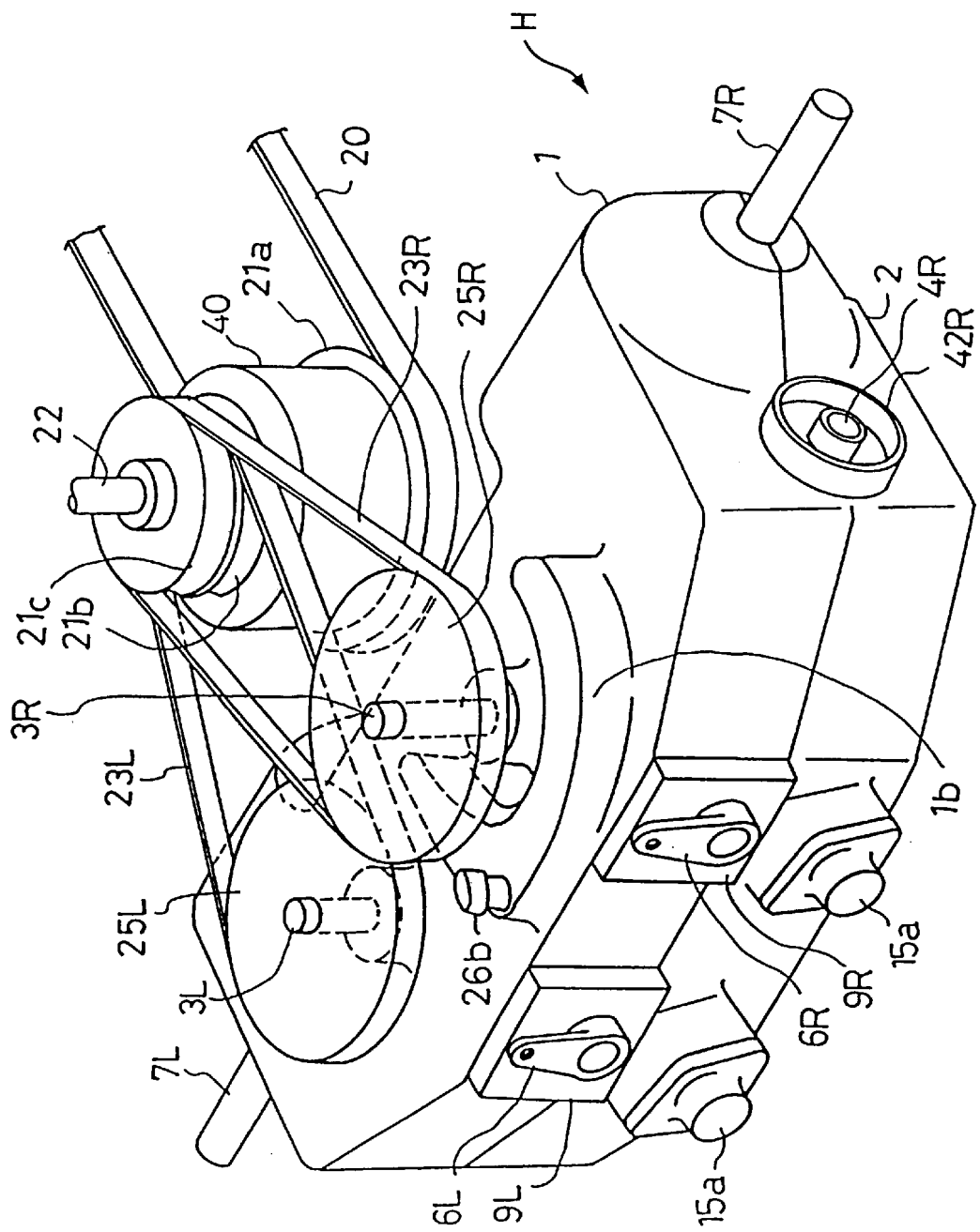
FIG. 7 is a perspective view of a second embodiment of the axle driving apparatus of the present invention.
Figure 8:
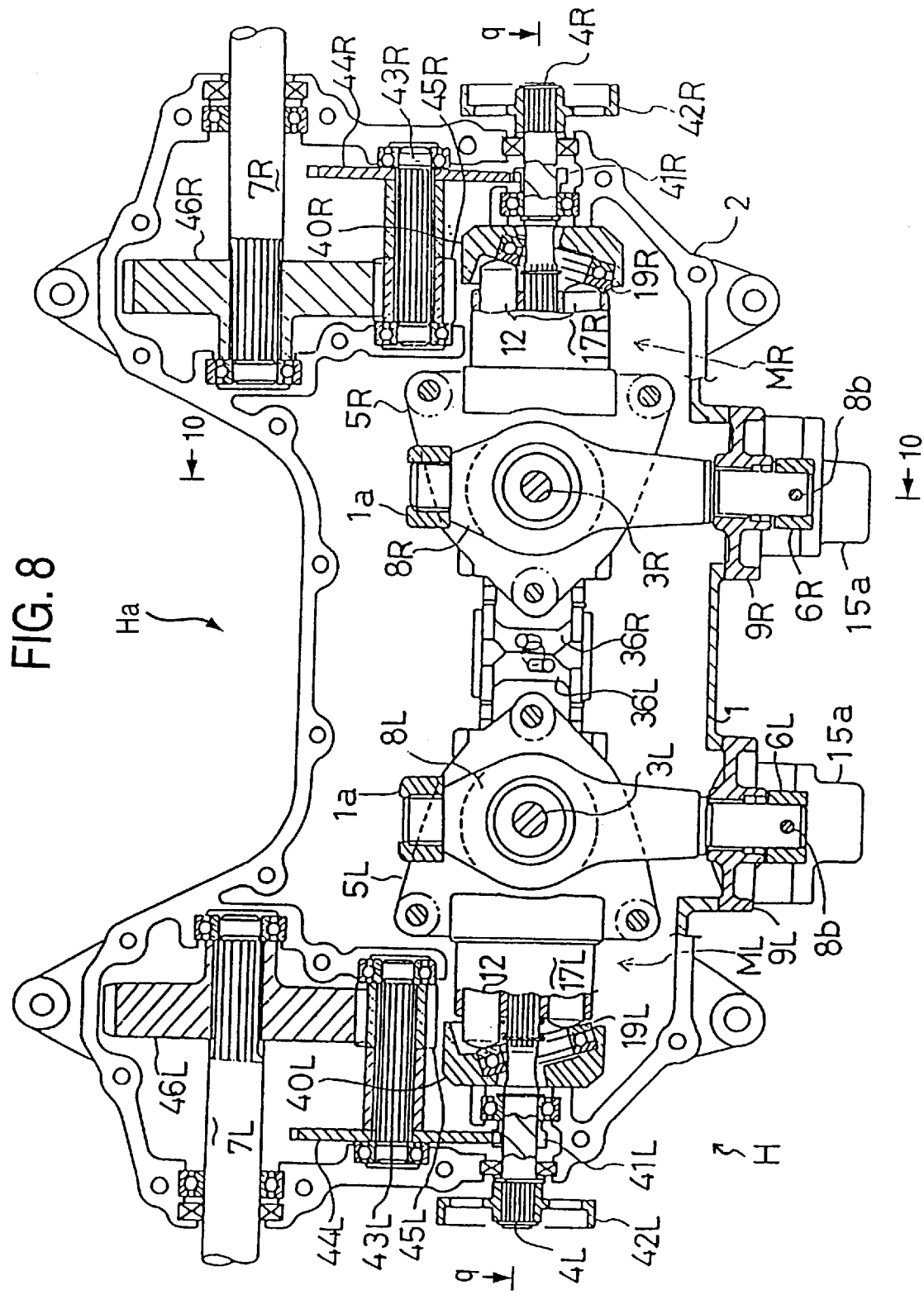
FIG. 8 is a plan view in partial cross section of the axle driving apparatus of FIG. 7, from which an upper half of the housing has been removed.
Figure 9:
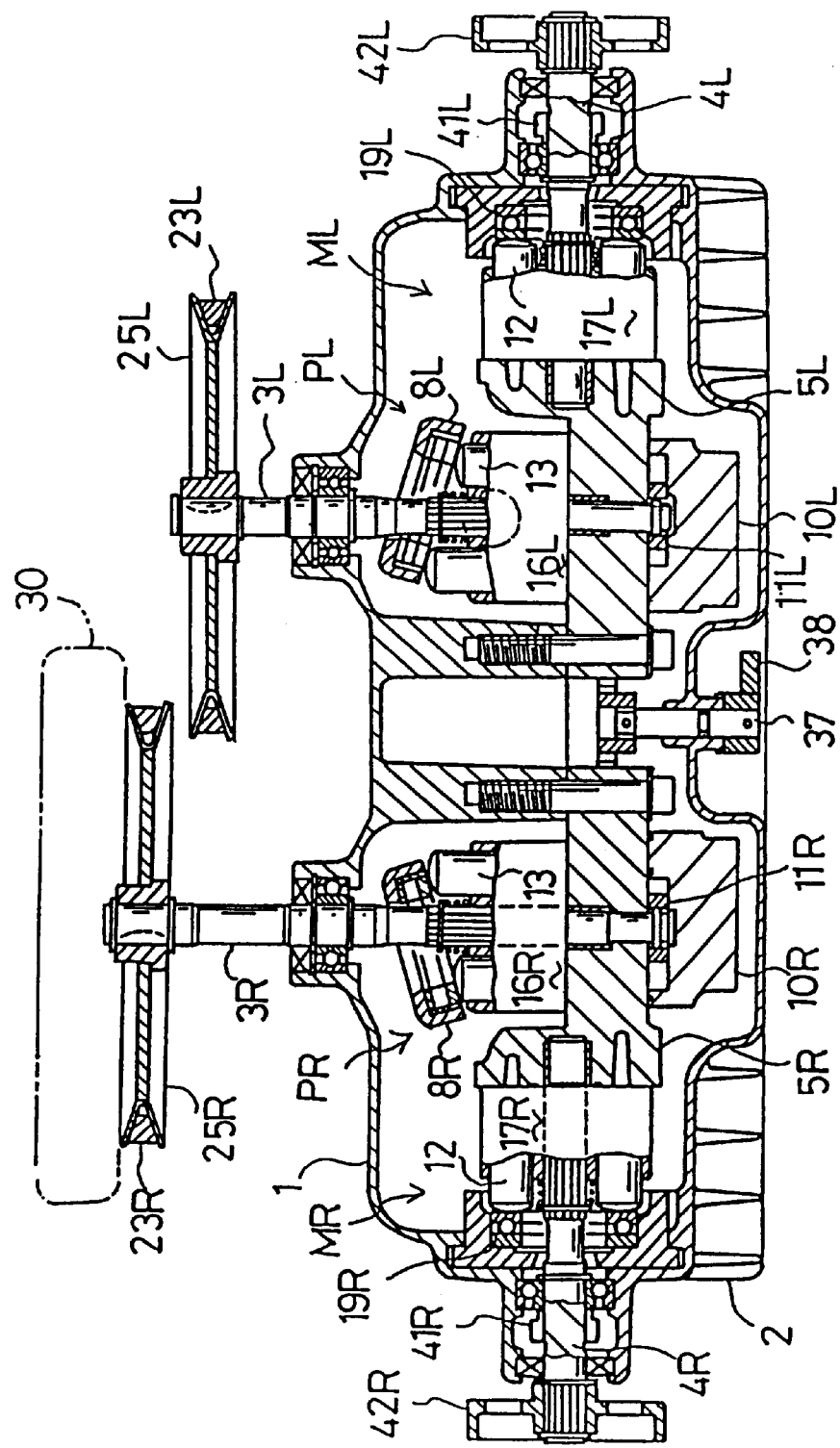
FIG. 9 is a cross sectional view taken along line 9—9 in FIG. 8.
Figure 10:
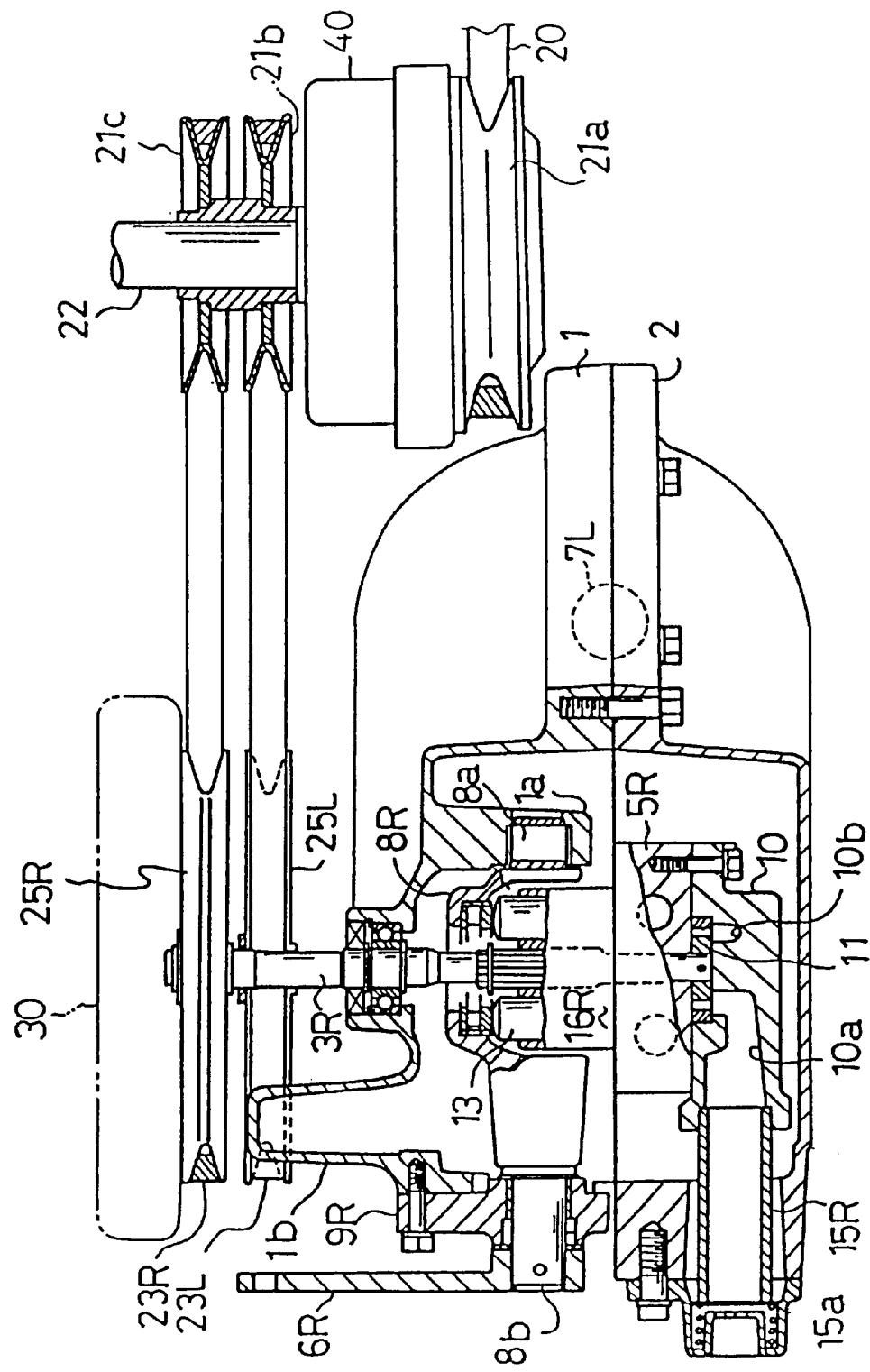
FIG. 10 is a cross sectional view taken along line 10—10 in FIG. 8.
Figure 11:
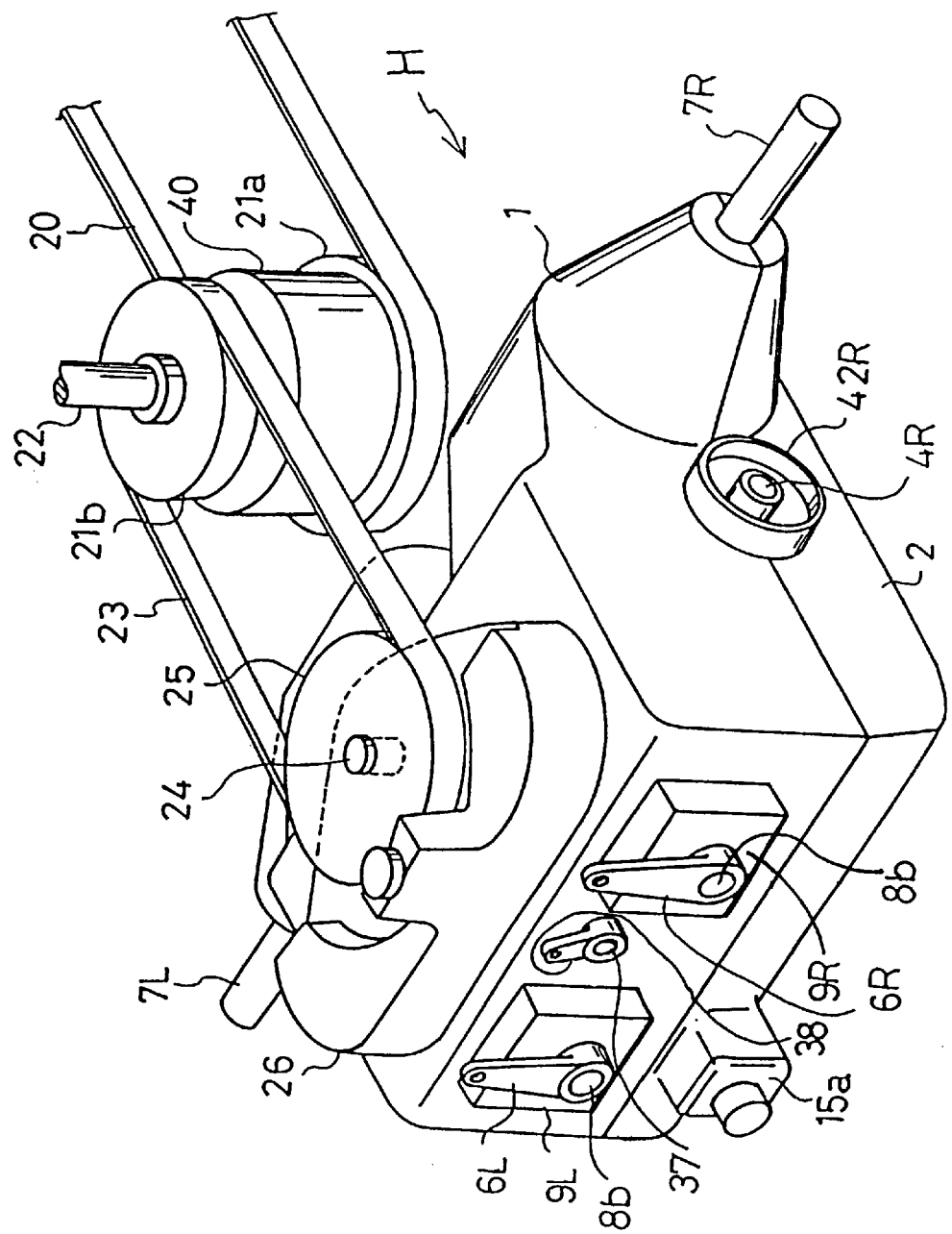
FIG. 11 is a perspective view of a third embodiment of the axle driving apparatus of the present invention.
Figure 12:
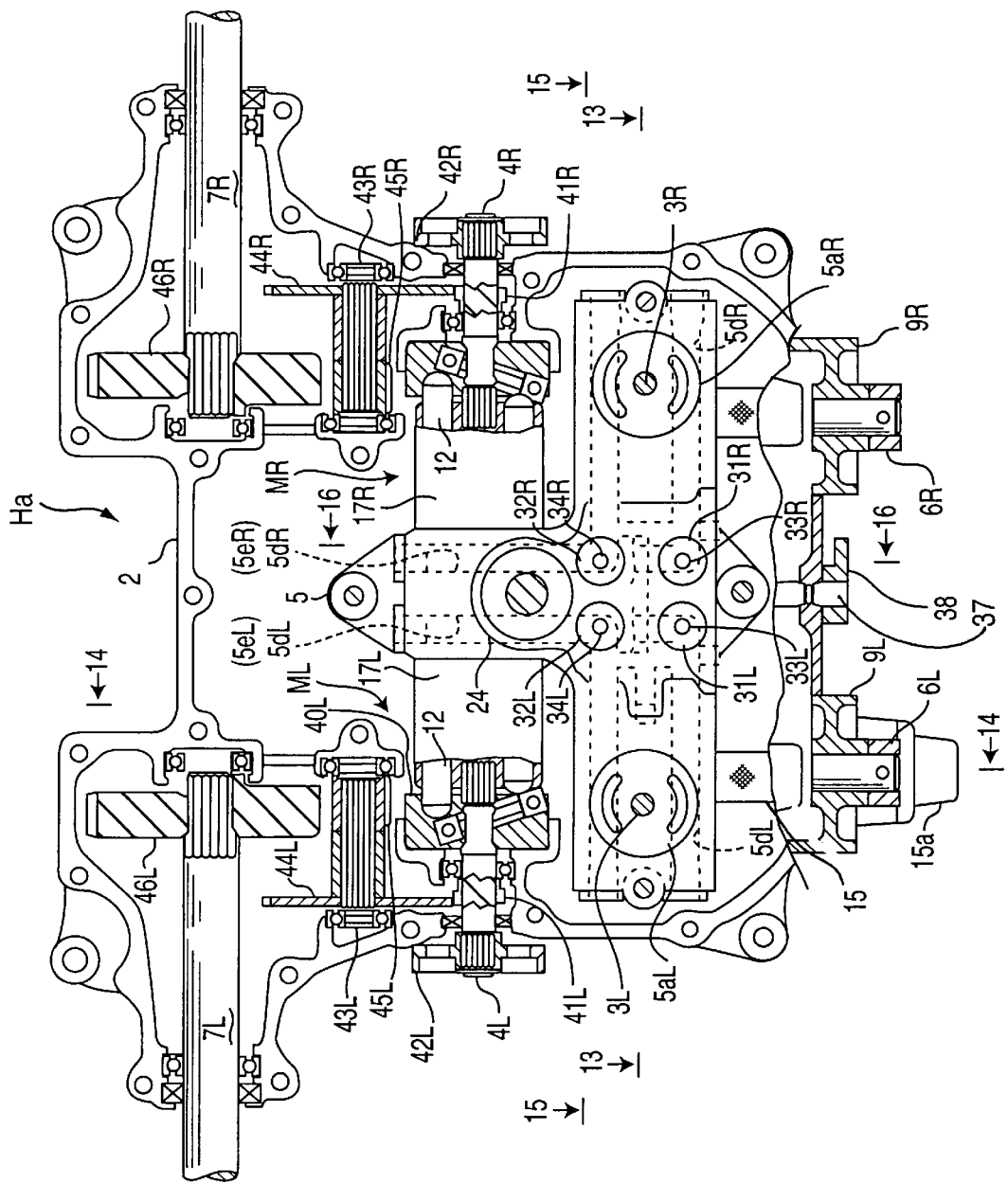
FIG. 12 is a plan view in partial cross section of the axle driving apparatus of the FIG. 12 from which a middle part of the housing has been removed.
Figure 13:
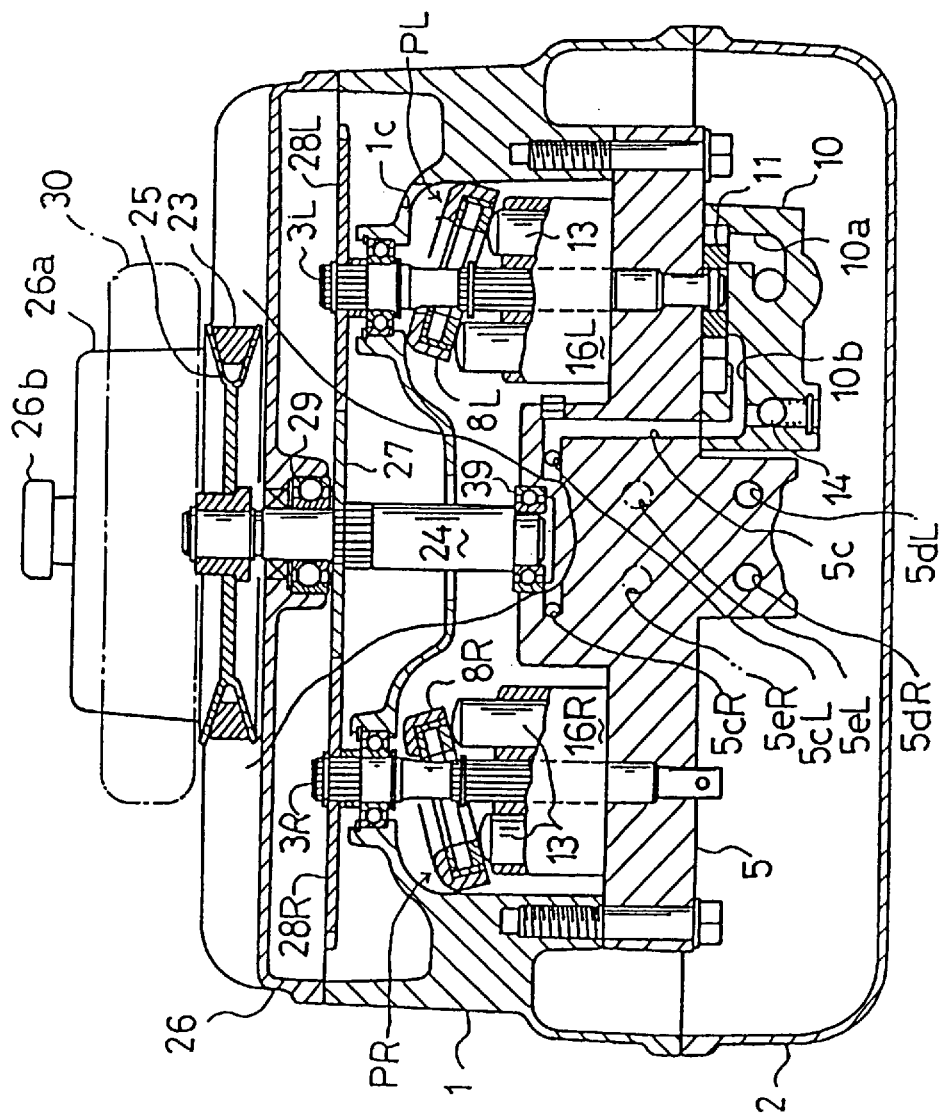
FIG. 13 is a cross sectional view taken along line 13—13 in FIG. 12.

Check valves 31L and 31R and 32L and 32R, as shown in FIG. 6, have push pins 33L, 33R, 34L and 34R projecting from center sections 5L and 5R in an opposing manner with respect to each other, enabling the respective closed circuits to be open. Push pins 33L, 33R, 34L and 34R are biased by springs 35 in a projecting direction. An urging plate 36L abuts against the extreme ends of push pins 33L and 34L. Urging plate 36R abuts against the extreme ends of push pins 33R and 34R, respectively. Urging plates 36L and 36R are disposed back to back and are slidably guided in the pushing directions of push pins 33L, 34L, 33R, and 34R by a pair of ribs formed on the inside surface of lower housing part 2.

Elongated bores 36a are open at the centers of each urging plate 36L and 36R. A cam 37a is inserted into each elongated bore 36a. Each cam 37a is mounted at its base around a shaft 37. Shaft 37, as shown in FIG. 4, is vertically and rotatably supported by a bottom wall of lower housing part 2 and is engaged with a biasing arm 38 disposed outside housing H. Biasing arm 38 is connected to a bypass lever 60 (FIG. 1) through a wire or the like.

Accordingly, when bypass lever 60 is operated, biasing arm 38 rotates in one direction causing shaft 37 to rotate and to shift cams 37a, which slide in elongated bores 36a to slidably move urging plates 36L and 36R. Pins 33L, 34L, 33R and 34R are simultaneously pushed in, so that check valves 31L, 32L, 31R and 32R are open to release the respective closed circuits, thereby enabling motor shafts 4L and 4R of hydraulic motors ML and MR to simultaneously freely rotate. Hence, even when the engine cannot be started, the walk behind type mower can be manually pushed by hand to be moved.

Brake drums 42L and 42R engage with the extreme ends of motor shafts 4L and 4R that project outwardly from housing H. This comprises a band-type braking device, which is adapted to operate when the operator releases deadman levers 53L and 53R so as to enable motor shafts 4L and 4R to be simultaneously braked.

At intermediate portions of motor shafts 4L and 4R are gears 41L and 41R, respectively, which engage with larger diameter gears 44L and 44R on counter shafts 43L and 43R, respectively. Smaller diameter gears 45L and 45R also on counter shafts 43L and 43R, respectively, engage with final gears 46L and 46R, respectively, which are on axles 7L and 7R, respectively. Accordingly, power can be transmitted from hydraulic motors ML and MR to axles 7L and 7R, respectively. The left gear train disposed on the left side of housing H comprises a first power transmitting means and the right gear train disposed on the right side of housing H comprises a second power transmitting means.

The rotational axes of motor shaft 4L, counter shaft 43L and axle 7L are disposed approximately in parallel to each other and in the same plane as the joint surface of middle housing part 1 and lower housing part 2 of housing H and at one lateral side thereof. The rotational axes of motor shaft 4R, counter shaft 43R and axle 7R are disposed approximately in parallel to each other at the lateral side of Housing H. At the joint surface between middle housing part 1 and lower housing part 2 are bearings for supporting to the various shafts, thereby enabling the axle driving apparatus to have a simplified assembly and housing H to be simply manufactured. Since the motor shafts 4L and 4R, counter shafts 43L and 43R, and axles 7L and 7R, are disposed laterally symmetrically and on the same axis, respectively, the entire housing H can be made smaller and the bearings for supporting these shafts are easy to manufacture.

Reference numeral 30 (FIG. 4) designates a cooling fan equipped on the upper surface of input pulley 25. Cooling fan 30 rotates together with input pulley 25 to blow cooling air from above housing H to minimize the oil temperature in housing H. In addition, a cooling fan (not shown) is provided at engine side pulley 21b (FIG. 2), thereby enabling a further temperature increase in oil temperature to be minimized.

Next, a second embodiment of the present invention will be described with reference to FIGS. 7, 8, 9 and 10. Specifically, in this embodiment, the input shaft 24, transmission gears 27, 28L and 28R are not provided. Instead, pump shafts 3L and 3R which project upwardly from housing H are used as the power input shafts for the transmission. Input pulleys 25L and 25R are fixed onto the upper ends of pump shafts 3L and 3R, respectively. Three sets of pulleys 21a, 21b and 21c are provided at the lower end of crank shaft 22. Belts 23L and 23R are wound across pulleys 21b and 21c and input pulleys 25L and 25R to transmit power from the engine.

Housing H of the axle driving apparatus in this second embodiment is comprised by joining upper housing half 1 and lower housing half 2 at the peripheral flat joint surfaces thereof, so that the upper ends of pump shafts 3L and 3R are supported by bearings held in upper housing half 1. Components in housing H, which are similar to those in the first described embodiment, are designated with the same reference numerals and are generally not discussed in detail again.

Input pulleys 25L and 25R are mounted at different heights with respect to pump shafts 3L and 3R to permit pump shafts 3L and 3R to be disposed as close as possible to each other so as to reduce the lateral width of housing H. A part of the upper wall of upper housing half 1 is upwardly enlarged to form an expansion oil tank 1b.

The rotational axes of motor shaft 4L, counter shaft 43L and axle 7L are disposed approximately in parallel to each other in the same plane as the joint surface of upper housing half 1 and lower housing half 2, at one lateral side of housing H. The rotational axes of motor shaft 4R, counter shaft 43R and axle 7R are disposed approximately in parallel to each other in the same plane as the joint surface of upper housing half 1 and lower housing half 2 at the other lateral side of housing H. Bearings are disposed to support to the shafts along the joint surface thereby simplifying assembly. Since motor shafts 4L and 4R, counter shafts 43L and 43R, and axles 7L and 7R are disposed laterally symmetrically and on the same axis, respectively, housing H can be made smaller and the bearings for supporting the axes are easy to manufacture.

Next, explanation will be given of a third embodiment of the present invention in accordance with FIGS. 11–17. Elements which are similar to those described with respect to previously described embodiments are designated with the same reference numerals and are generally not discussed again in detail. The third embodiment of the axle driving apparatus of the present invention laterally disposes hydraulic pumps PL and PR and hydraulic motors ML and MR in order and substantially perpendicular with respect to axles 7L and 7R. Each pair of hydraulic pumps PL and PR and hydraulic motors ML and MR, when viewed longitudinally of housing H, are disposed in housing H in a relationship whereby they all mutually overlapped at least in part. Hydraulic pumps PL and PR are simultaneously driven by a single input shaft 24 disposed perpendicular and vertical to axles 7L and 7R. A pair of hydraulic pumps PL and PR, and hydraulic motors ML and MR are mounted on a common center section 5 formed as a single piece. A single charge pump 11, (FIG. 13) driven by input shaft 24, is mounted on the bottom of center section 5.

Housing H comprises upper housing part 26, middle housing part 1 and lower housing part 2. Center section 5 is fixed to substantially a lateral center of middle housing part 1 by four bolts. The lower portion of input shaft 24 perforates middle housing part 1 so as to be supported in the central portion of center section 5 through a bearing 39. The upper portion of input shaft 24 is supported in upper housing part 26 through a bearing 29. Input pulleys 25 engage with the upper end of input shaft 24 projecting from upper housing part 26 and is constructed in the same manner as the first described embodiment. The gear trains for transmitting the power from transmission gear 27 to hydraulic pumps PL and PR are also constructed in the same manner as the first described embodiment.

Figure 17:
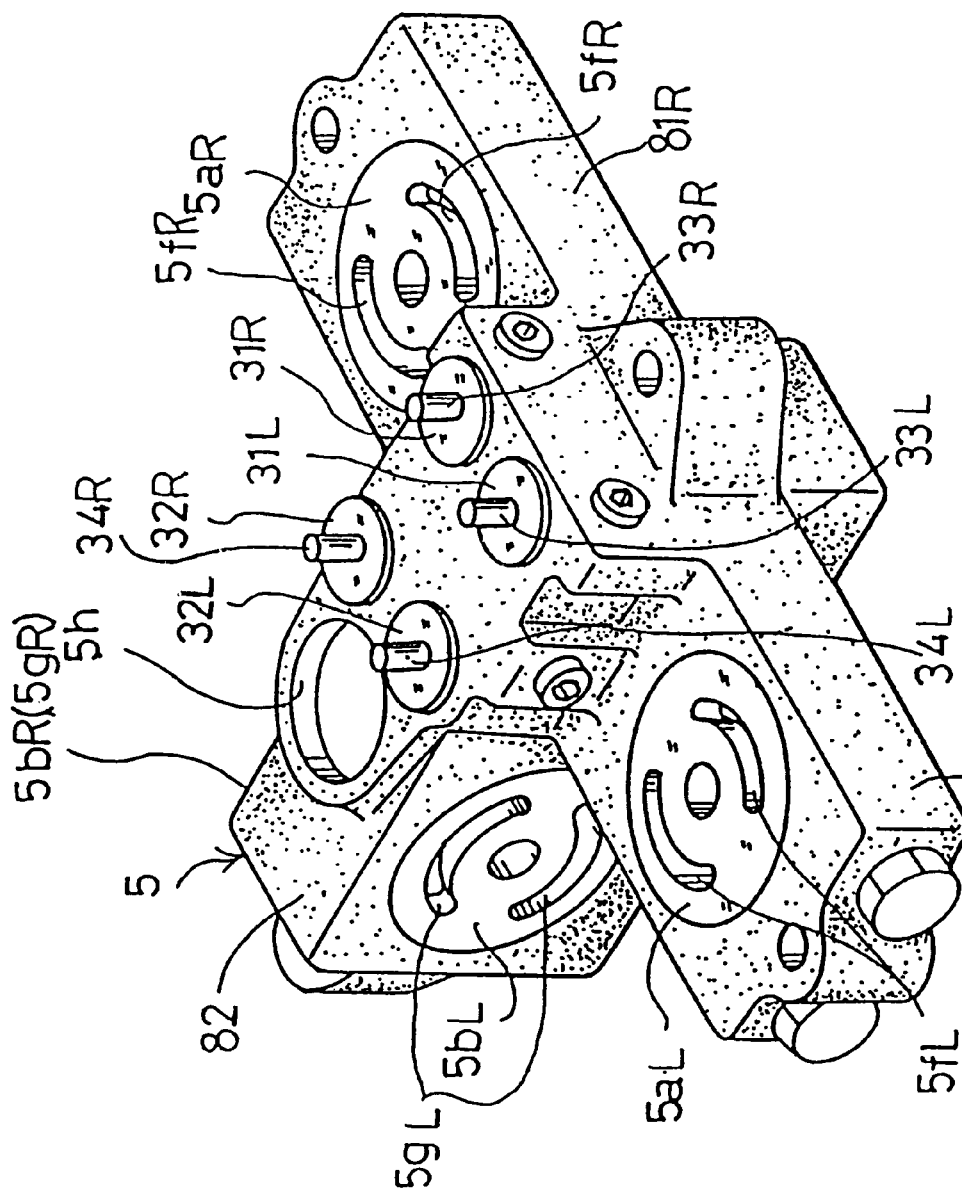
FIG. 17 is a perspective view of a center section of the embodiment of FIG. 11.
Figure 18:
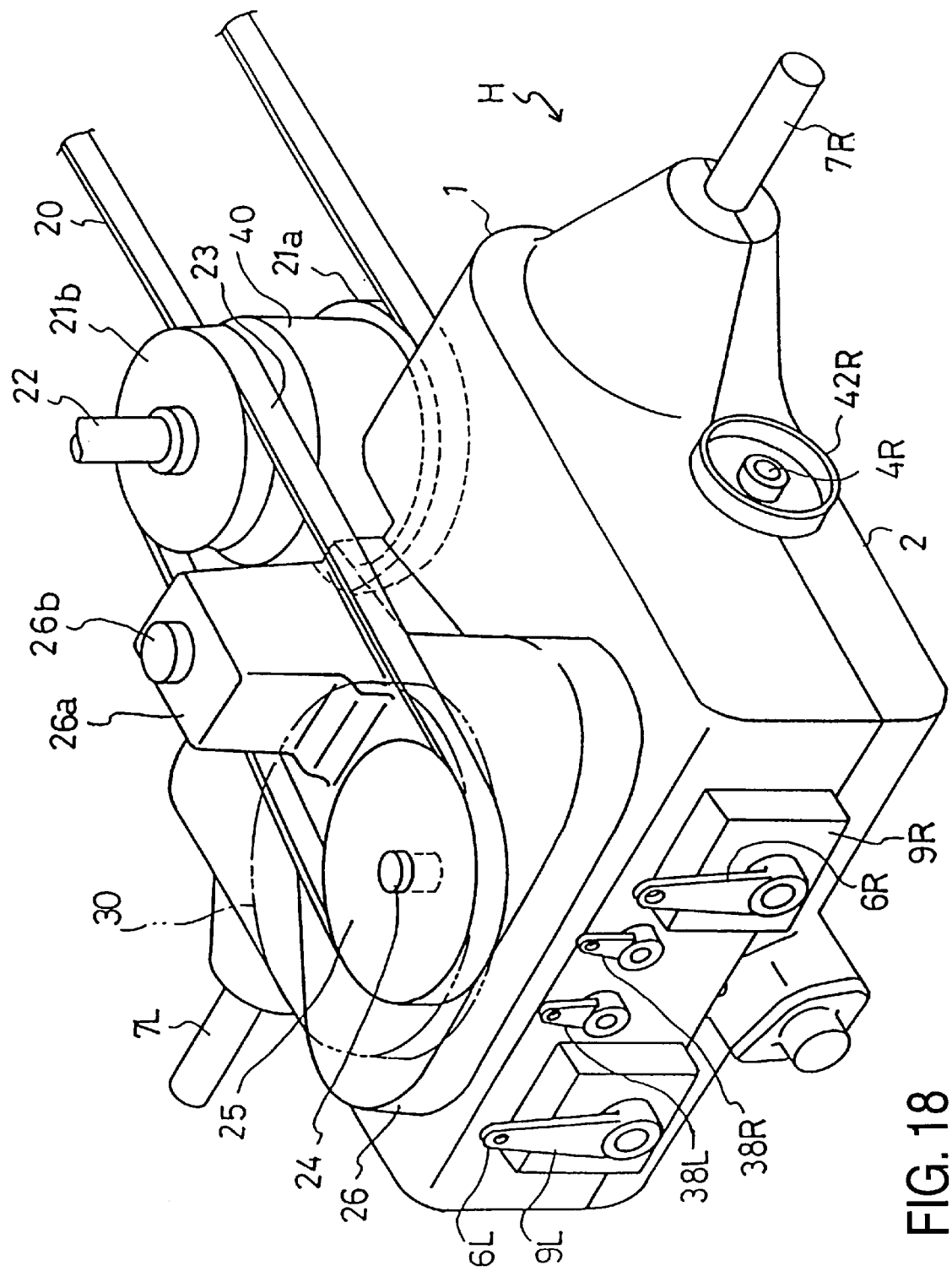
FIG. 18 is a perspective view of a fourth embodiment of the axle driving apparatus of the present invention.

Center section 5, disposed in the first portion of housing H is substantially T-like-shaped when viewed in plan, and, as shown in FIG. 17. A recess 5h for fitting therein bearing 39 is provided at the center of center section 5. Pump mounting surfaces 5aL and 5aR are disposed at the horizontal surfaces of plate-like-shaped and laterally projecting portions 81L and 81R, respectively. At both left and right vertical side surfaces of plate-like portion 82 which project from projecting portions 81L and 81R are motor mounting surfaces 5bL and 5bR. Cylinder blocks 16L and 16R of hydraulic pumps PL and PR are rotatably mounted on pump mounting surfaces 5aL and 5aR, respectively. Cylinder blocks 17L and 17R of hydraulic motors ML and MR are mounted on motor mounting surfaces 5bL and 5bR, respectively.

The axes of rotation of hydraulic pumps PL and PR extend vertically and are disposed perpendicular to axles 7L and 7R. The axes of rotation of hydraulic motors ML and MR extend horizontally and are disposed in parallel to axles 7L and 7R. Hydraulic pump PL and hydraulic motor ML, whose axes of rotation are perpendicular to each other and do not intersect with each other, are disposed in a row rearwardly of axle 7L. Hydraulic pump PR and hydraulic motor MR are disposed in a row rearwardly of axle 7R.

Open kidney ports 5fL and 5fR in communication with the intake ports and discharge ports of cylinder blocks 16L and 16R respectively are disposed at pump mounting surfaces 5aL and 5aR of center section 5, as shown in FIG. 17. Open kidney ports 5gL and 5gR which communicate with the intake ports and discharge ports of cylinder blocks 17L and 17R, respectively, are disposed at motor attaching surfaces 5bL and 5bR.

A pair of oil passages 5dL and 5eL for connecting kidney ports 5fL on pump mounting surface 5aL with kidney ports 5gL on motor mounting surface 5bL are disposed in center section 5, thereby comprising closed circuits through which the operating oil circulates between hydraulic pump PL and hydraulic motor ML. A pair of oil passages 5dR and 5eR connect kidney ports 5fR on pump mounting surface 5aR with kidney ports 5gR on motor attaching surface 5bR, thereby comprising closed circuits for circulating the operating oil between hydraulic pump PR and hydraulic motor MR.

Figure 15:
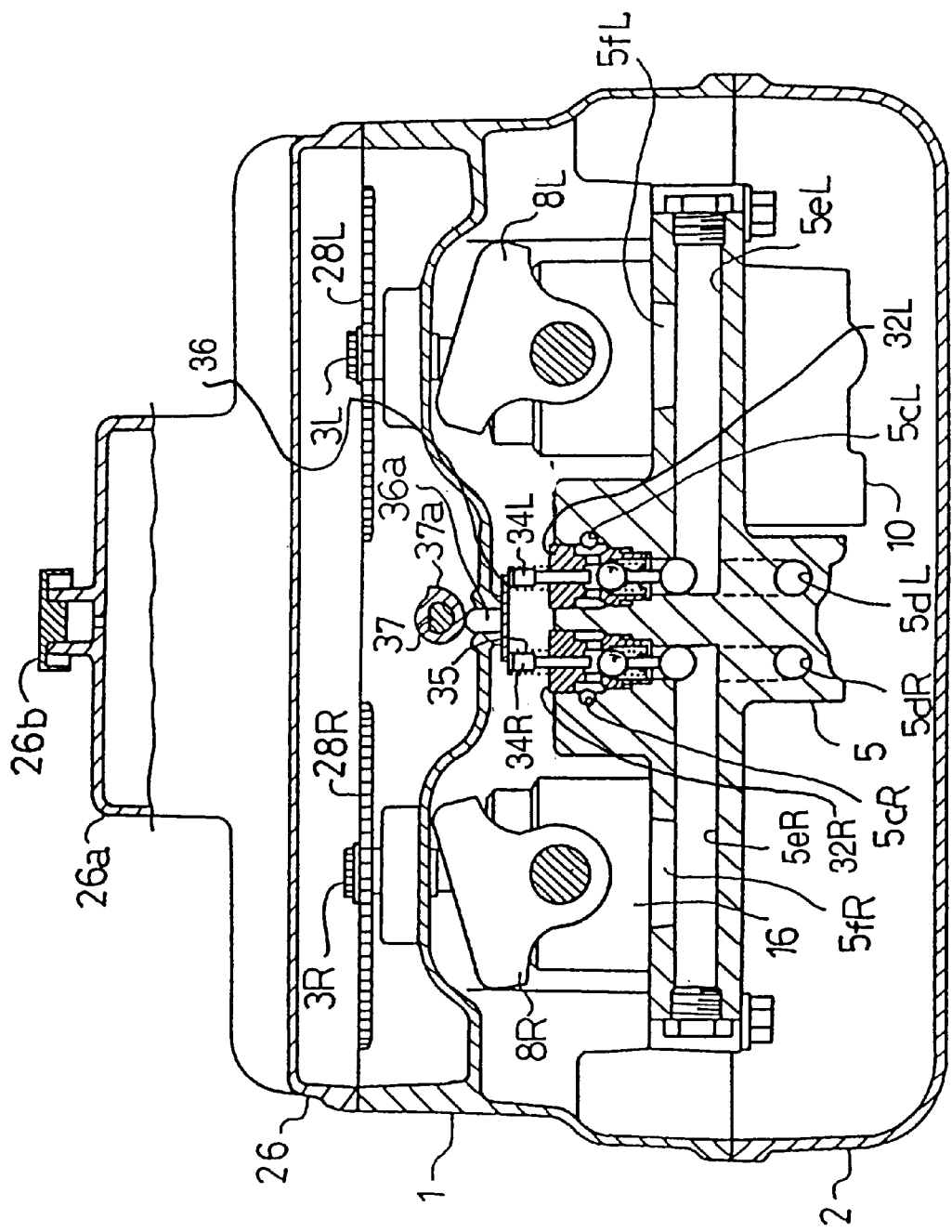
FIG. 15 is a cross sectional view taken along line 15—15 in FIG. 12.
Figure 16:
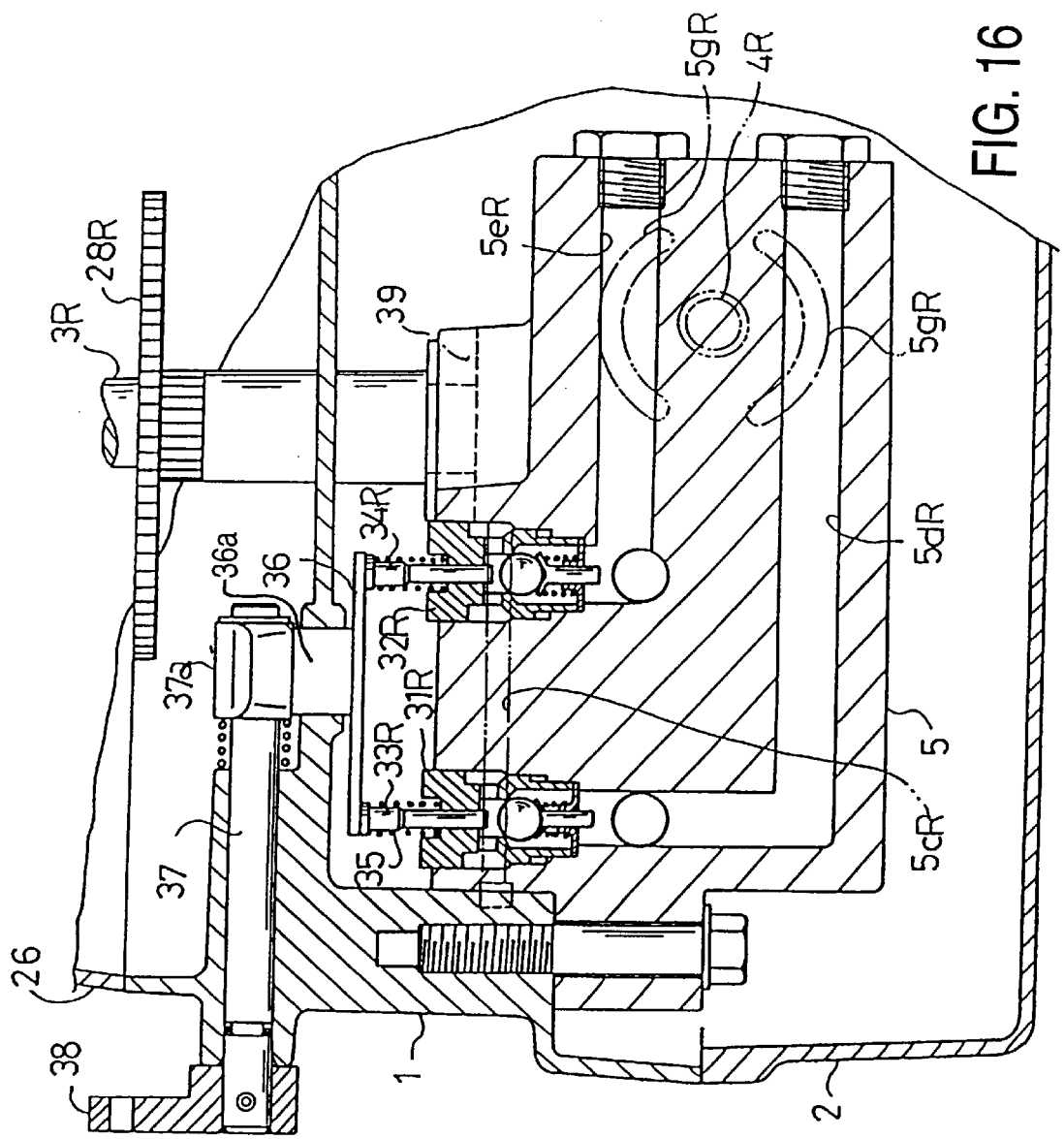
FIG. 16 is a cross sectional view taken along line 16—16 in FIG. 12.

As shown in FIGS. 15, 16 and 17, check; valves 31L, 32L, 31R and 32R for supplying the operating oil are vertically interposed in the respective oil passages 5dL, 5eL, 5dR, and 5eR. Within center section 5 are provided a horizontally disposed passage 5cL for connecting the inlet ports of check valves 31L and 32L with each other and a longitudinally horizontally disposed passage 5cR for connecting the inlet ports of check valves 31R and 32R with each other (FIG. 15). The two left and right passages 5cL and 5cR connect at base sides thereof with one operating oil supply passage 5c (FIG. 13) open at the rear surface of pump mounting surface 5aL of center section 5.

Figure 14:
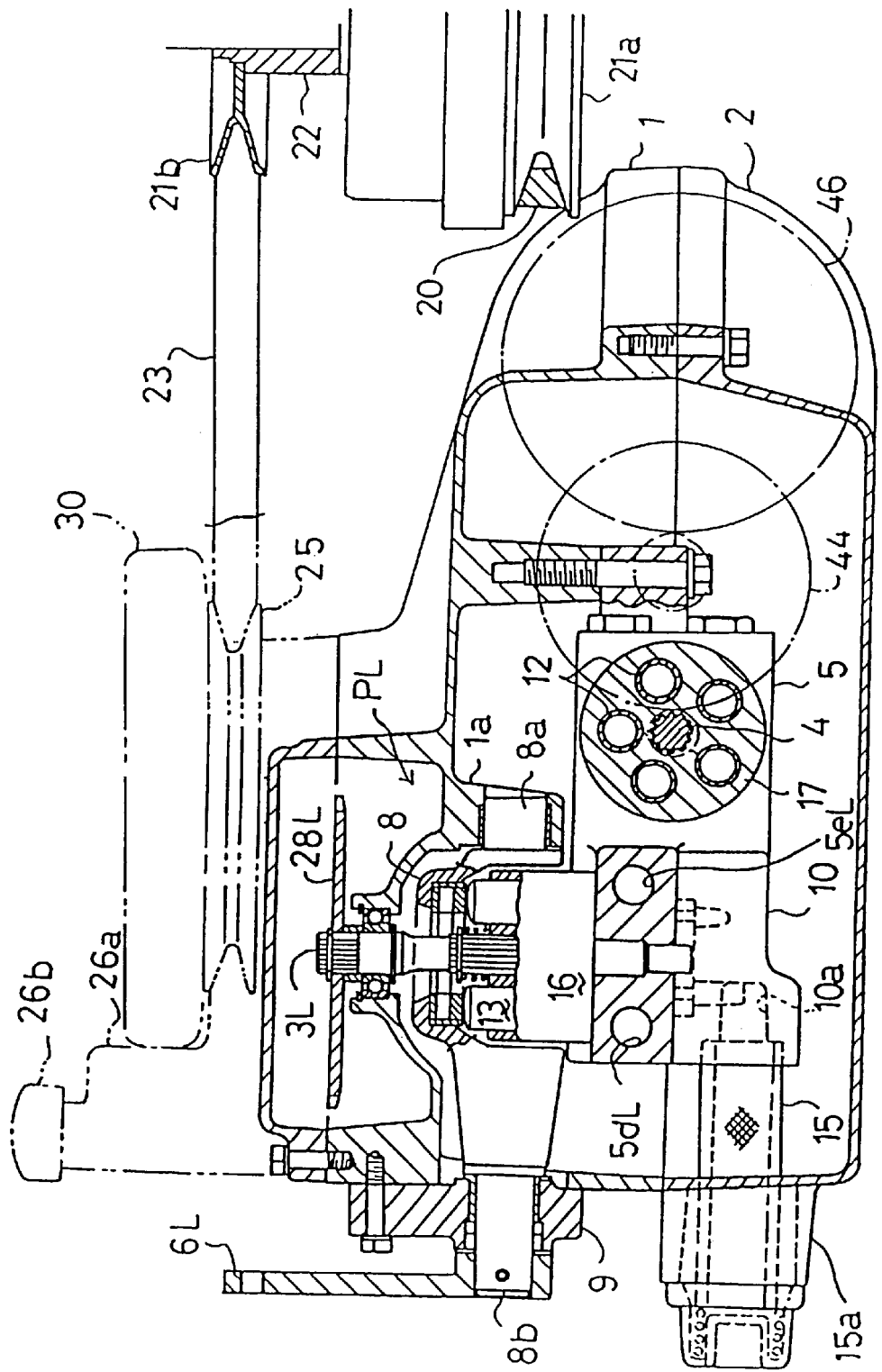
FIG. 14 is a cross sectional view taken along line 14—14 in FIG. 12.

A trochoid type charge pump 11 is disposed only on the bottom surface of pump mounting surface 5aL and communicates with the lower end of pump shaft 3L. Charge pump 11 is covered with a pump casing 10, in which an intake-side oil passage 10a and a discharge side oil passage 10b for charge pump 11 are disposed. Intake-side oil passage 10a, as shown in FIG. 14, communicates with single filter 15 which filters the oil in the first portion of housing H and introduces the oil into the pump PL. Discharge side oil passage 10b is provided with a relief valve 14 (FIG. 13), by which the discharged oil can be adjusted to a predetermined oil pressure. Discharge-side oil passage 10b communicates with operating oil supply passage 5c.

The pressurized oil discharged from charge pump 11 flows from discharge side oil passage 10b to operating oil supply passage 5c in center section 5 and branches into passages 5cL and 5cR. Supply oil flowing in passage 5cL reaches the inlet ports at check valves 3 IL and 32L and releases, by oil pressure, a check valve at the low pressure side among oil passages 5dL and 5eL so that the oil can be taken into the closed fluid circuit. Simultaneously, the supply oil flowing in passage 5cR reaches the inlet ports of check valves 31R and 32R and releases, by oil pressure, a check valve at the low pressure side among oil passages 5dR and 5eR so that the oil can be taken into the closed fluid circuit. Thus, the single charge pump 11 is adapted to simultaneously supply oil in housing H to the two closed fluid circuits within center section 5.

Check valves 31L, 31R, 32L and 32R are provided with push pins 33L, 33R, 34L, and 34R, which are operated from the exterior of housing H to allow the oil pressure in the respective closed circuits to be released. Push pins 33L, 33R, 34L and 34R project vertically upward from the upper surface of center section 5. Push pins 33L, 33R, 34L and 34R are upwardly biased by springs 35 and one urging plate 36 is disposed on the upper ends of push pins 33L, 33R, 34L and 34R to press push pins 33L, 33R, 34L and 34R down. A cam 37a on one end of a shaft 37 is disposed on a projection 36a at substantially the center of urging plate 36. Shaft 37 is rotatably supported to the rear surface of middle housing part 1 and is fixed to an arm 38 outside housing H. Arm 38 is connected to bypass lever 60 as described above with respect to FIG. 1.

Next, a fourth embodiment of the present invention will be described with reference to FIGS. 18–24. Components in housing H which are similar to those described above, are generally designated with the same reference numerals and are generally not discussed again. The fourth embodiment of the axle driving apparatus of the present invention is an improvement to the third embodiment discussed immediately above, which similarly includes a center section 5 and a charge pump 11 in common to the first and second hydrostatic transmissions. However, the construction of center section 5 and the mounting position for charge pump 11 are different.

Specifically, center section 5 is fixed at substantially a lateral center of middle housing part 1 through six bolts. The lower portion of input shaft 24 perforates middle housing part 1, and is supported in central portion 80 of center section 5 through a bearing 39. The upper portion of input shaft 24 is supported in upper housing part 26 through bearing 29. The upper end of input shaft 24 projecting from upper housing part 26 fixedly supports input pulley 25.

Figure 24:
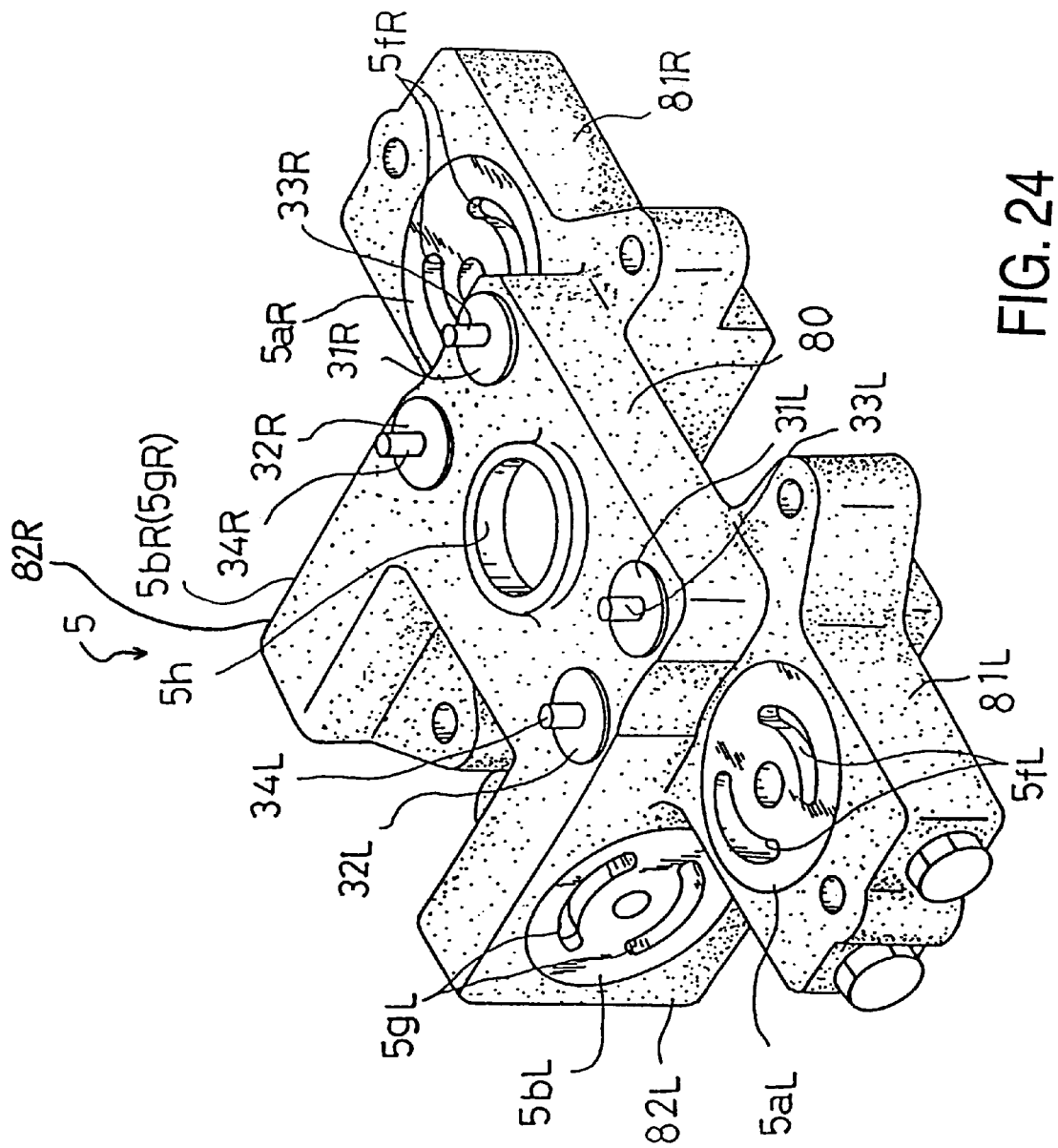
FIG. 24 is a perspective view of a center section of the embodiment of FIG. 18.

Center section 5, as shown in FIG. 24, comprises a central portion 80 having a horizontal surface. The horizontal surface of central portion 80 has a recess 5h for holding bearing 39. A pair of horizontal plate-like portions 81L and 81R extend laterally from central portion 80. A pair of vertical plate-like portions 82L and 82R extend forwardly from central portion 80. Central portion 80, horizontal plate-like portions 81L and 81R, and vertical plate-like portions 82L and 82R are integrated into a single unit.

At the horizontal surface of plate-like portions 81L and 81R are pump mounting surfaces 5aL and 5aR. At the vertical outside surfaces of plate-like portions 82L and 82R are motor mounting surfaces 5bL and 5bR. The rotational axes of cylinder blocks 16L and 16R of hydraulic pumps PL and PR on center section 5 are disposed substantially vertically and substantially parallel to each other. The rotational axes of cylinder blocks 17L and 17R of hydraulic motors ML and MR on center section 5 are disposed substantially horizontally and co-axially. Hydraulic pumps PL and PR and hydraulic motors ML and MR are disposed in a row rearwardly of axles 7L and 7R. Within center section 5 are provided oil passages 5dL, 5eL, 5dR and 5eR, so that, as in the third embodiment discussed above, closed circuits for circulating the operating oil therein are formed between hydraulic pump PR and hydraulic motor MR, and between hydraulic pump PL and hydraulic motor ML.

Figure 19:
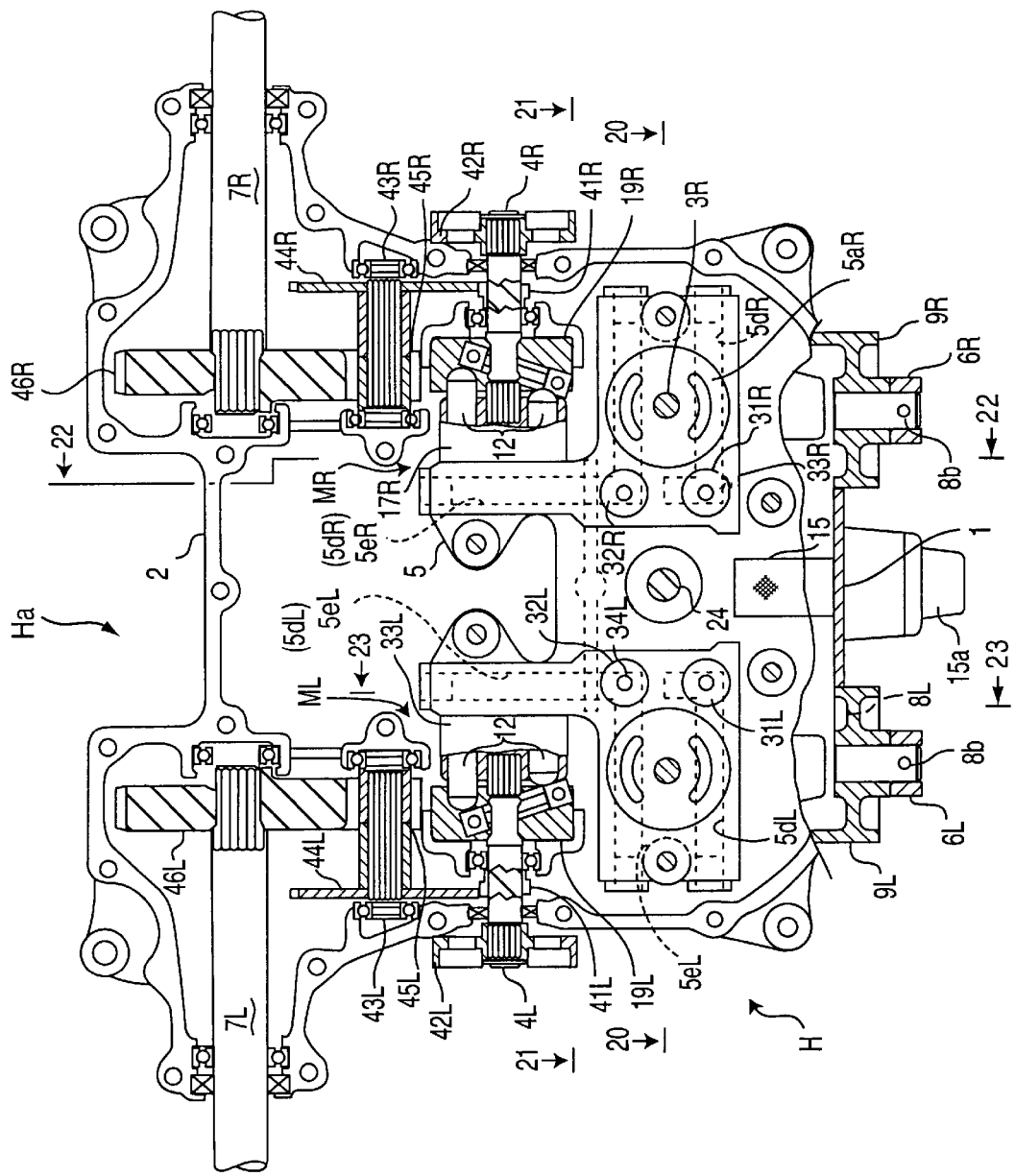
FIG. 19 is a plan view in partial cross section of the axle driving apparatus of FIG. 18 from which a middle part of the housing has been removed.
Figure 20:
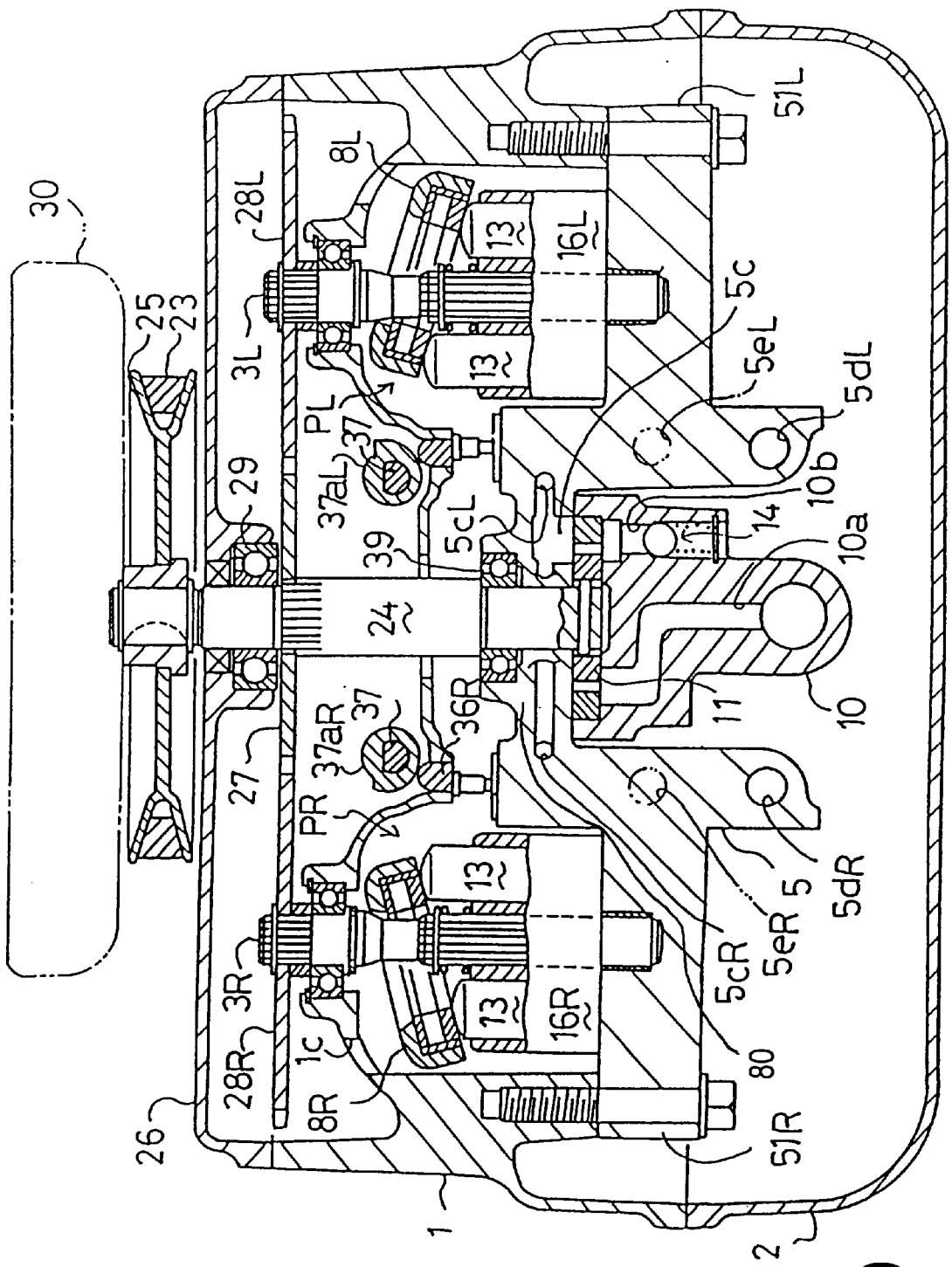
FIG. 20 is a cross sectional view taken along line 20—20 in FIG. 19.
Figure 21:
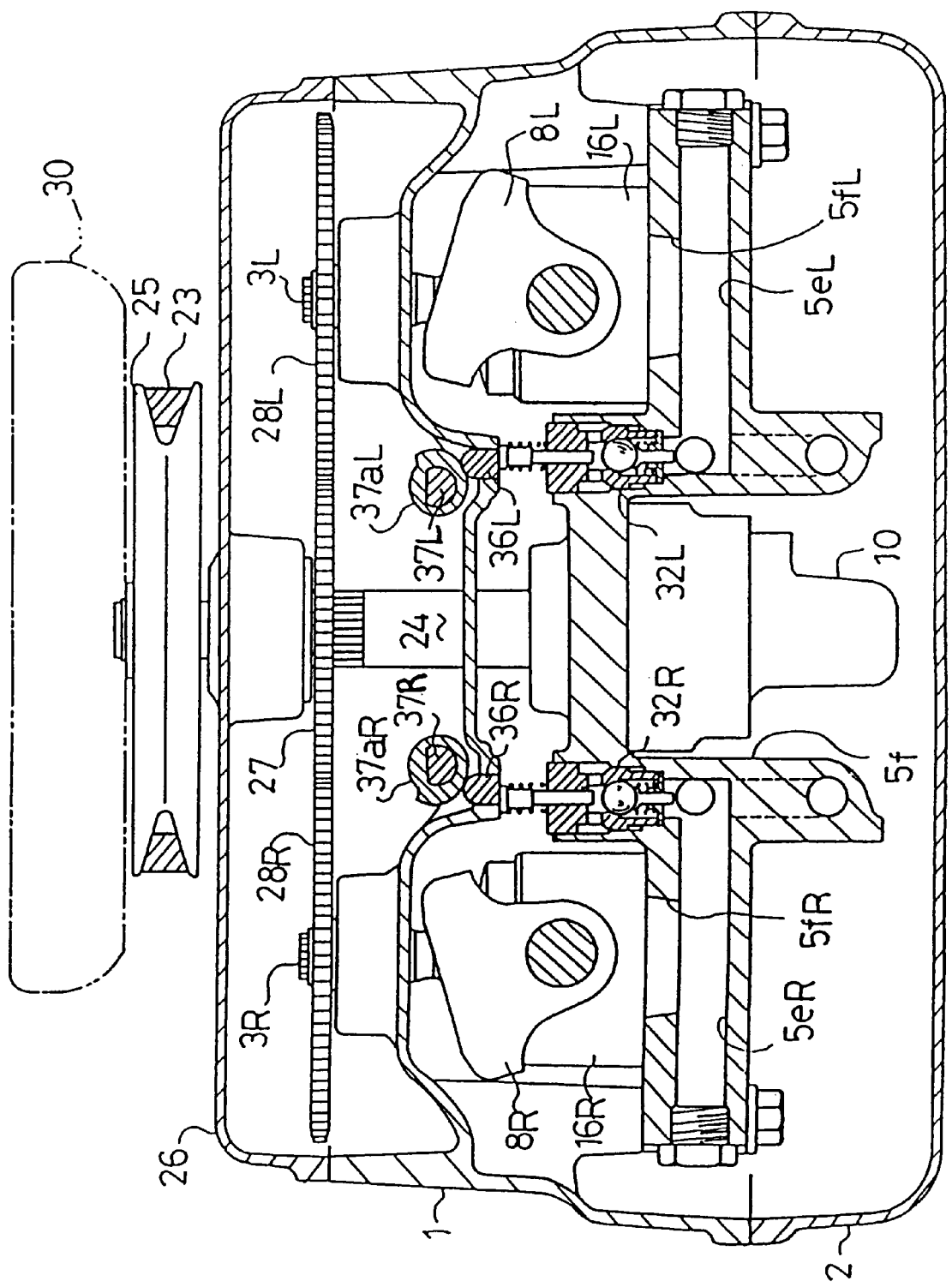
FIG. 21 is a cross sectional view taken along line 21—21 in FIG. 19.
Figure 22:
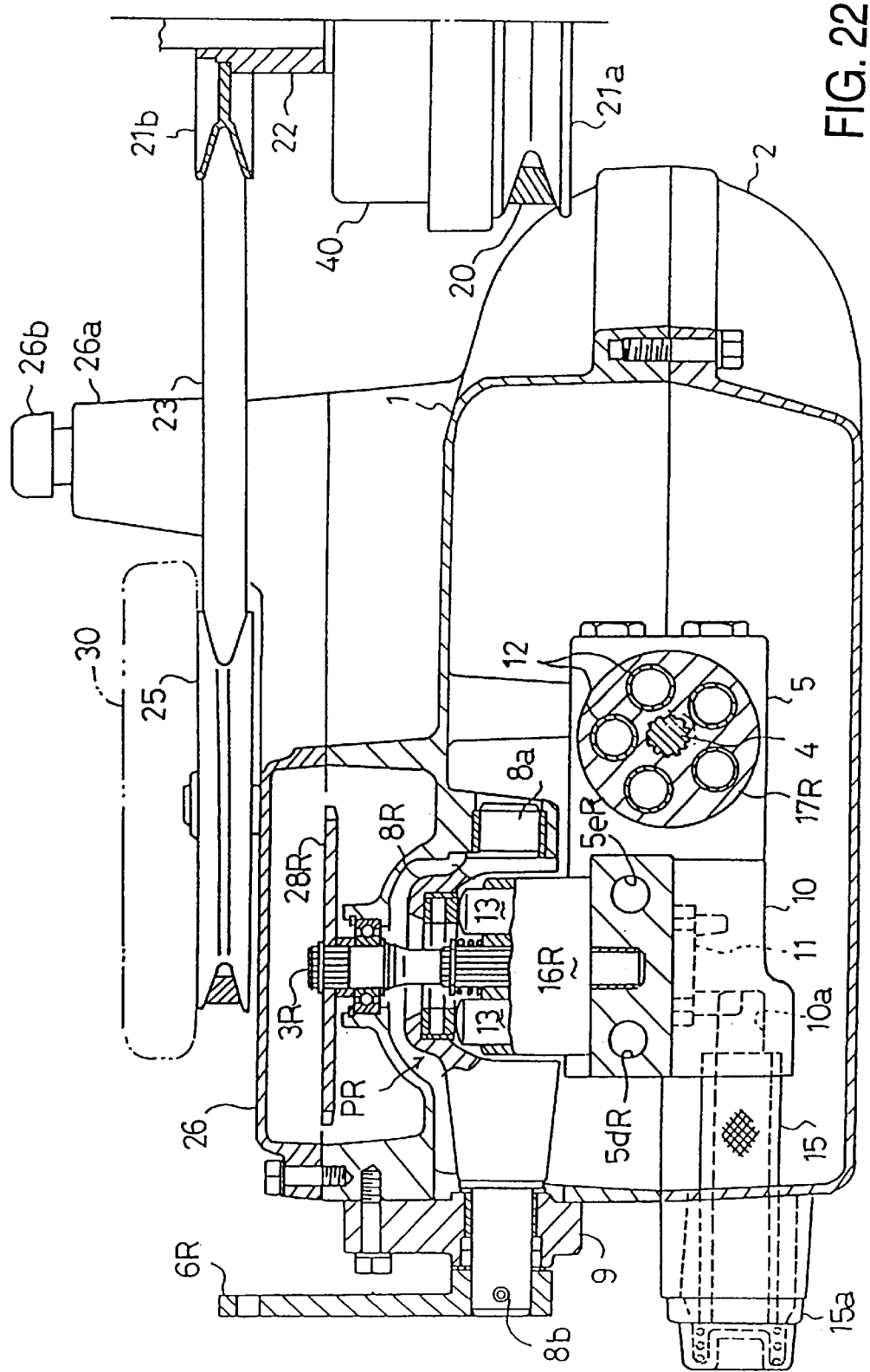
FIG. 22 is a cross sectional view taken along line 22—22 in FIG. 19.
Figure 23:
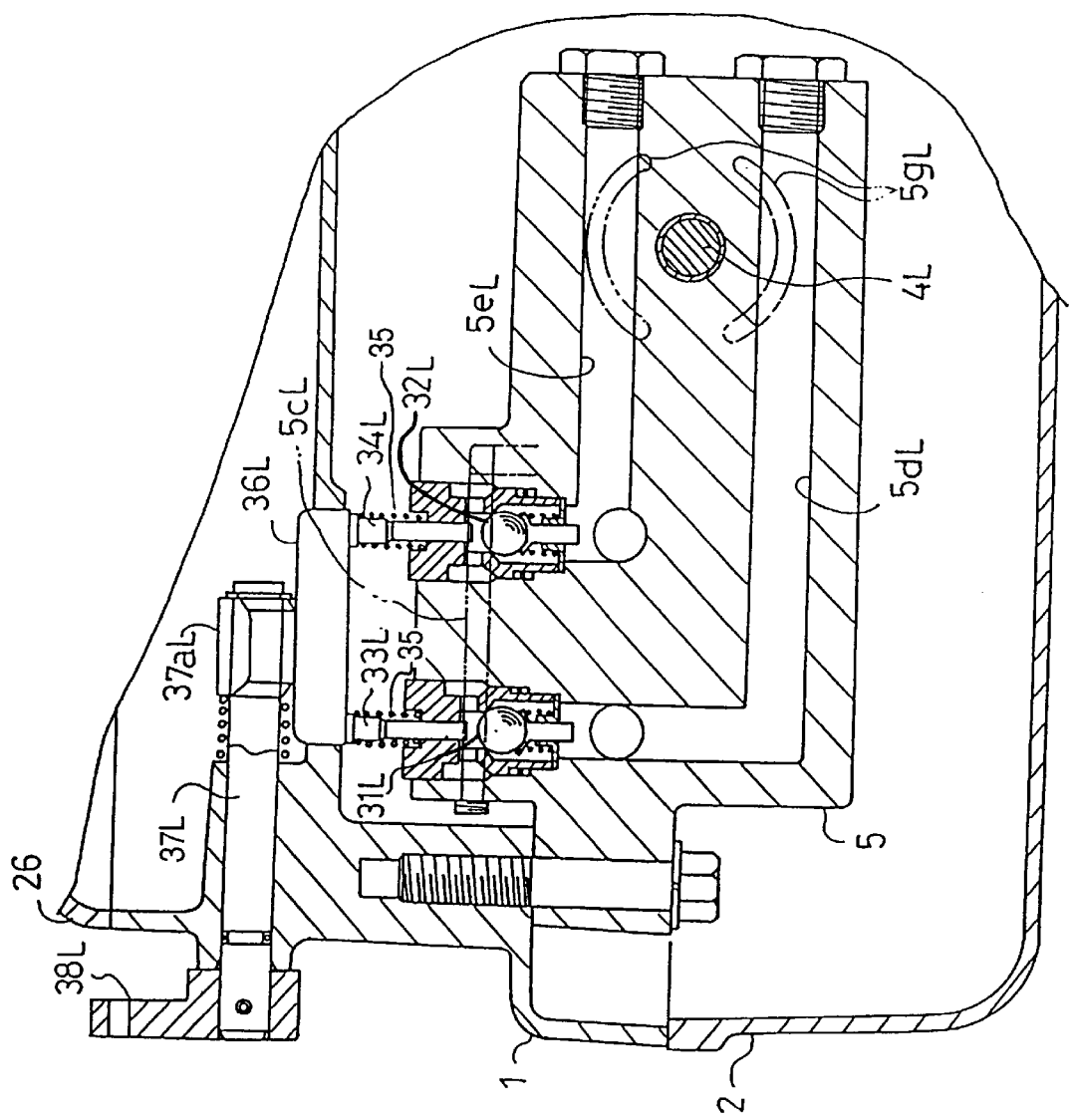
FIG. 23 is a cross sectional view taken along line 23—23 in FIG. 19.

As shown in FIG. 20, the lower end of input shaft 24 perforates central portion 80. A pump casing 10 is disposed at the lower surface of central portion 80 of center section 5. Charge pump 11 is housed in pump casing 10. Charge pump 11 is connected to and driven by the lower end of input shaft 24. Pump casing 10 is provided with intake-side oil passage 10a for allowing oil to be supplied to charge pump 11 and discharge-side oil passage 10b for allowing oil to exit from charge pump 11. Intake-side oil passage 10a, as shown in FIGS. 19 and 22, communicates with a single filter 15 to filter the oil in the first portion of housing H and to introduce oil into charge pump 11. Discharge-side oil passage 10b is provided with a relief valve 14 which adjusts the discharged oil to a predetermined oil pressure, and communicates with an operating oil supply oil passage 5c open at the lower surface of the central portion 50 of the center section 5 (FIG. 20).

The pressurized oil discharged from charge pump 11 flows from the oil passage 10b to the operating oil supply passage 5c of center section 5 and branches into oil passages 5cL and 5cR. The supply oil flowing into passage 5cL reaches the inlet ports of check valves 31L and 32L and releases, by oil pressure, a check valve at the low pressure side among oil passages 5dL and 5eL so as to permit oil to be taken into the closed fluid circuit thereof. Simultaneously, the supply oil flowing into passage 5cR reaches the inlet ports of the check valves 31R and 32R to release, by oil pressure, a check valve at the low pressure side among oil passages 5dR and 5eR to permit oil to be taken into the close fluid circuit thereof.

Push pins 33L, 34L, 33R and 34R, which can release the oil pressure in the respective closed circuits from the exterior of the housing H, project vertically upwardly from the upper surface of central portion 80 of center section 5 at check valves 31L, 32L, 31R and 32R. Push pins 33L, 34L, 33R and 34R are upwardly biased by springs 35. Urging plates 36L and 36R are disposed on the upper ends of push pins 33L, 34L, 33R and 34R to enable push pins 33L, 34L, 33R and 34R to be equally and simultaneously pressed down.

Check valves 31L, 32L, 31R, and 32R are spaced laterally apart from each other in comparison with the third embodiment discussed above, whereby cams 37aL and 37aR act on urging plates 36L and 36R, respectively. The upper ends of urging plates 36L and 36R extend into the second portion of housing H and abut against cams 37aL and 37aR, respectively. Cams 37aL and 37aR are provided at one end of shafts 37L and 37R, respectively. Shafts 37L and 37R are rotatably supported at the rear wall of middle housing part 1 and engage with arms 38L and 38R, respectively, outside housing H. Arms 38L and 38R are interlocked with bypass lever 60 so that, when the bypass lever 60 is operated to rotate arms 38L and 38R, cams 37aL and 37aR push down urging plates 36L and 36R, respectively, and simultaneously push pins 33L, 34L, 33R and 34R are pressed downwardly to open all check valves 31L, 31R, 32L and 32R, thereby releasing oil in the respective closed fluid circuits into housing H.

Next, a fifth embodiment of the axle driving apparatus of the present invention, which is described in accordance with FIGS. 25–29, will be disclosed. The fifth embodiment of the invention is similar to the third and fourth embodiments described above. Therefore, discussion is provided only for the modified center section S and the support construction for vertical input shaft 24.

Center section 5 in this fourth embodiment is a large scale single unit used commonly by both hydraulic pumps PL and PR, and hydraulic motors ML and MR. In contrast, in the fifth embodiment, a center section 5L is provided for hydraulic pump PL and hydraulic motor ML, and a center section 5R is provided for hydraulic pump PR and hydraulic motor MR. Center section 5L is separate from center section 5R.

Figure 29:
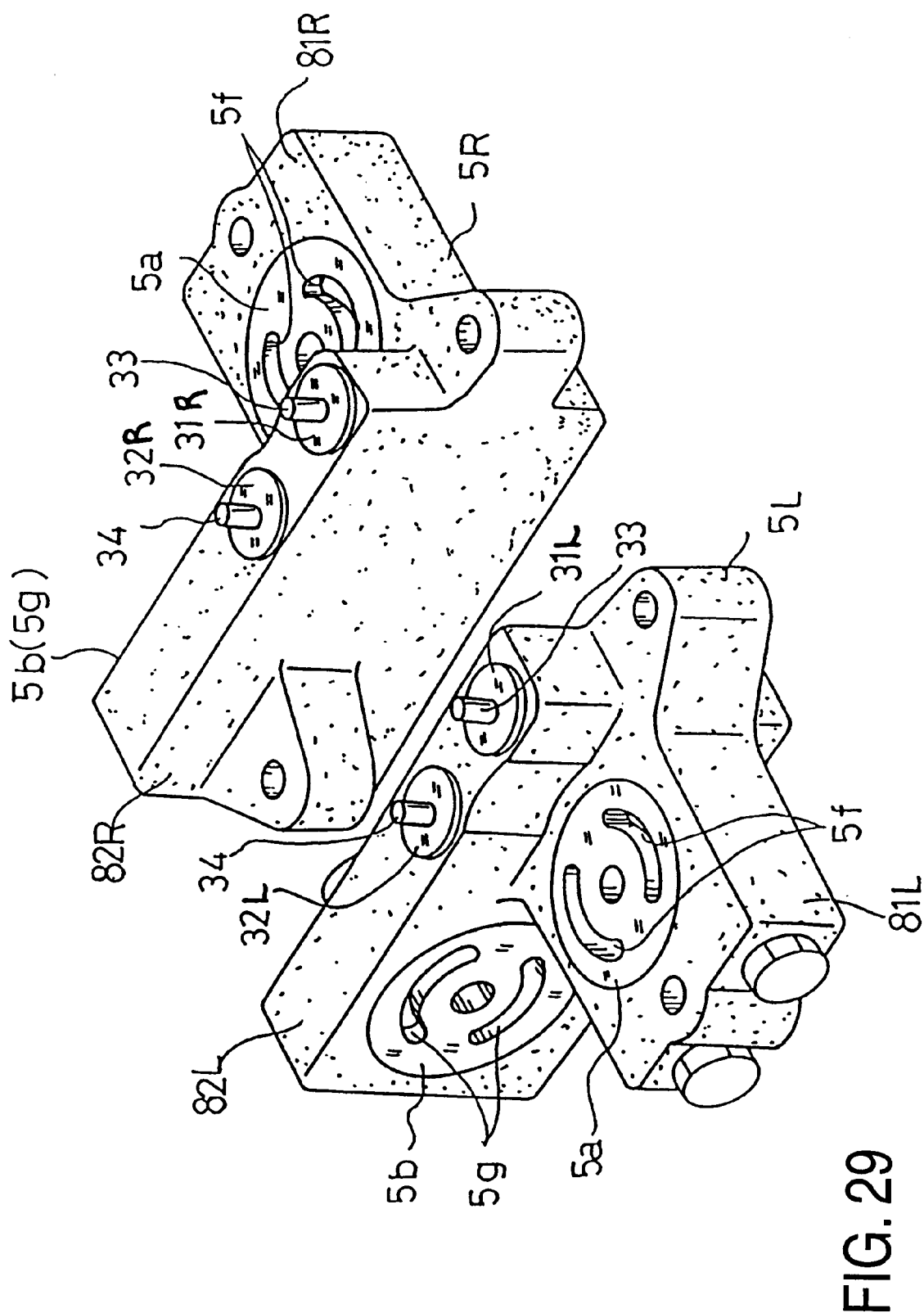
FIG. 29 is a perspective view of a center section of the fifth embodiment of FIG. 25.
Figure 30:
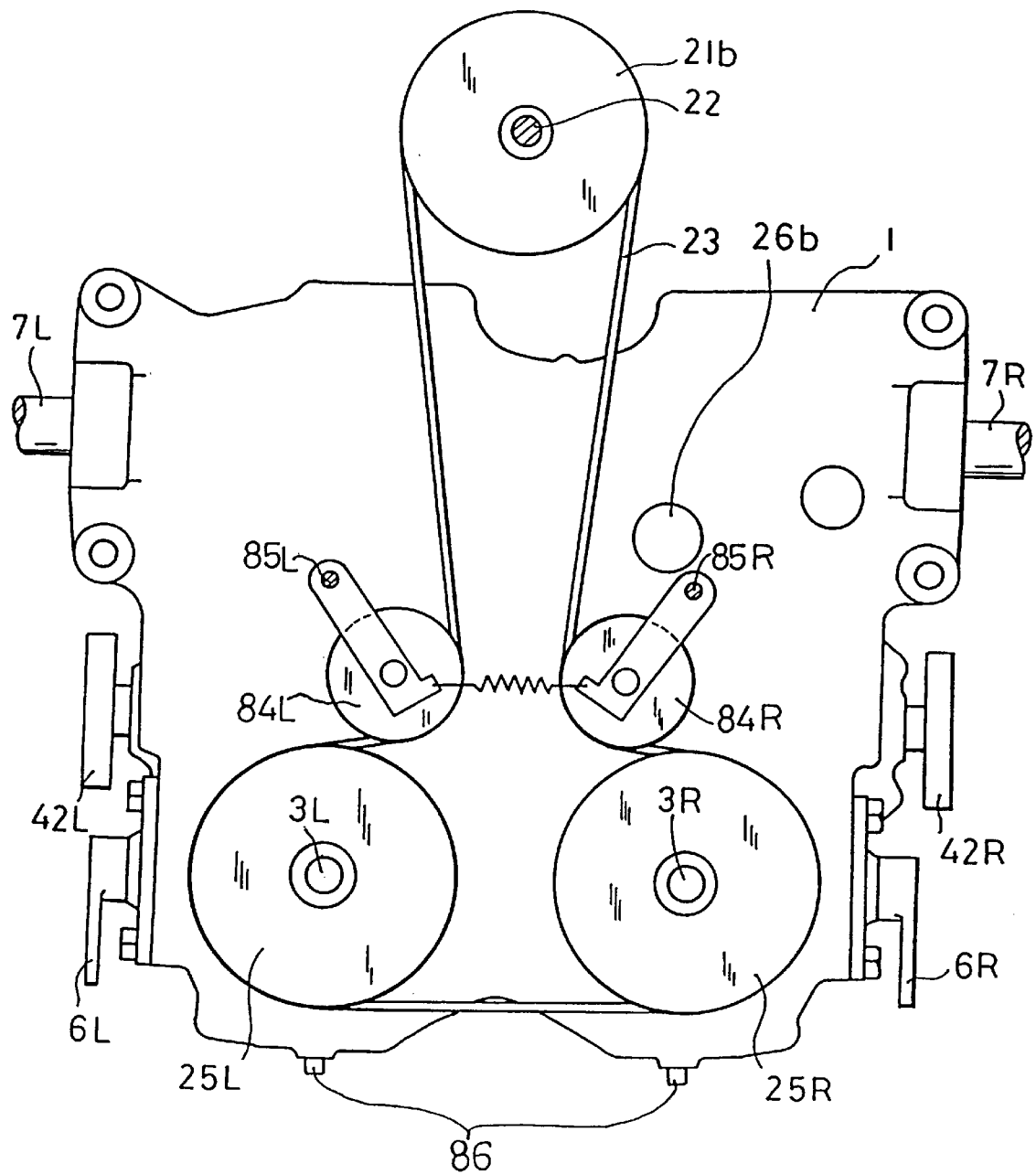
FIG. 30 is a plan view of a sixth embodiment of the axle driving apparatus of the present invention.
Figure 31:
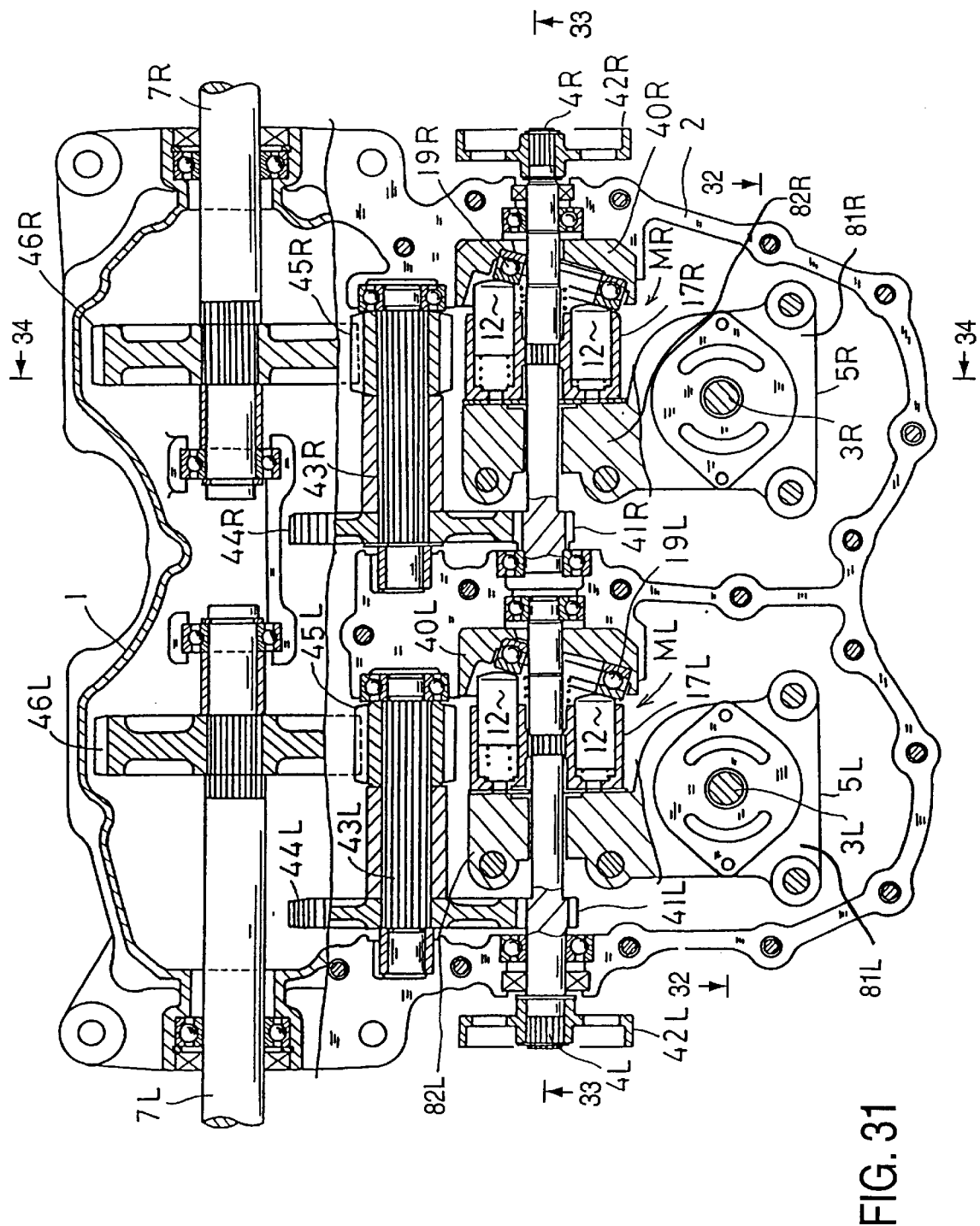
FIG. 31 is a plan view in partial cross section of the embodiment of FIG. 30, from which an upper half of the housing has been removed.
Figure 32:
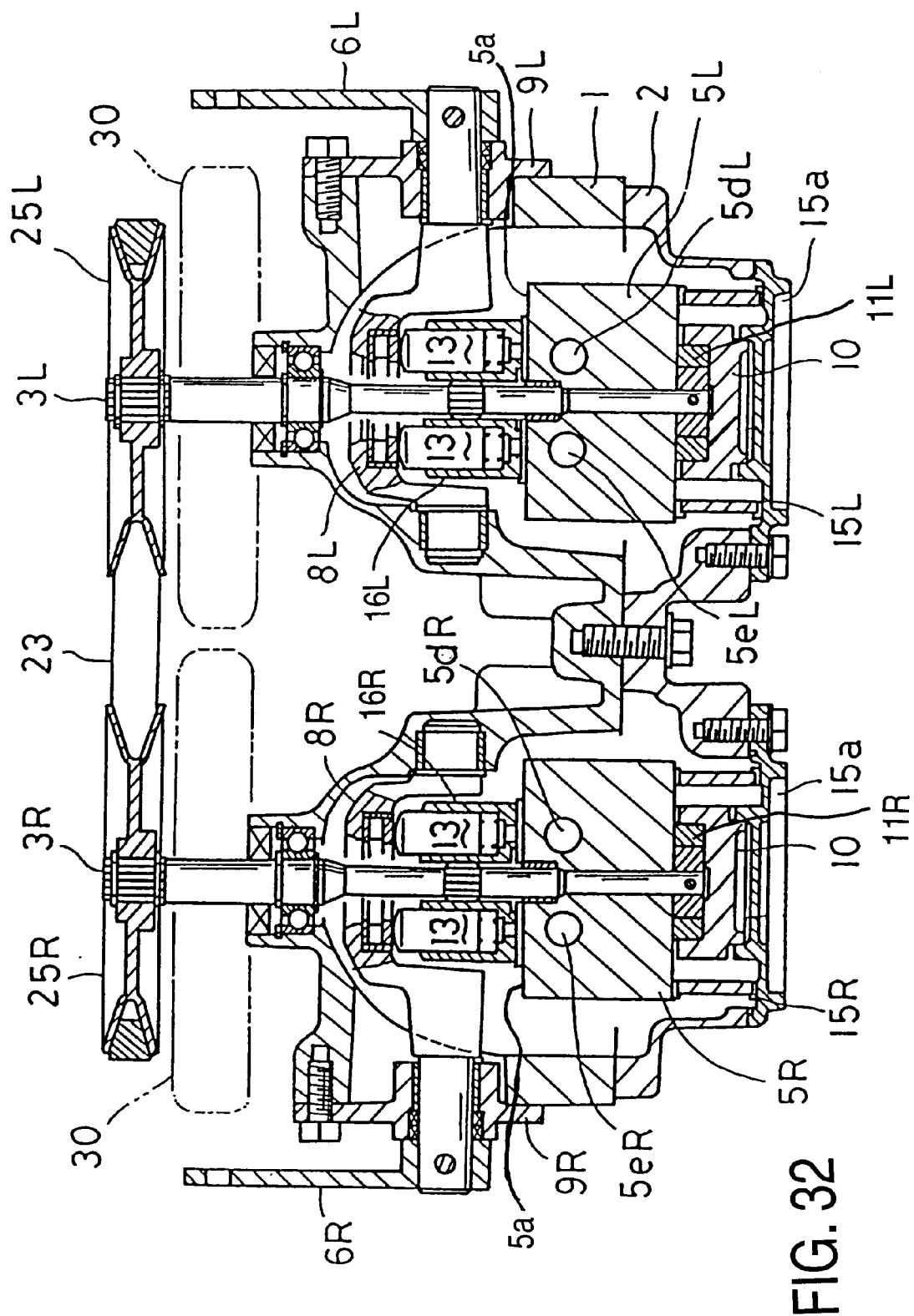
FIG. 32 is a cross sectional view taken along line 32—32 in FIG. 31.
Figure 33:
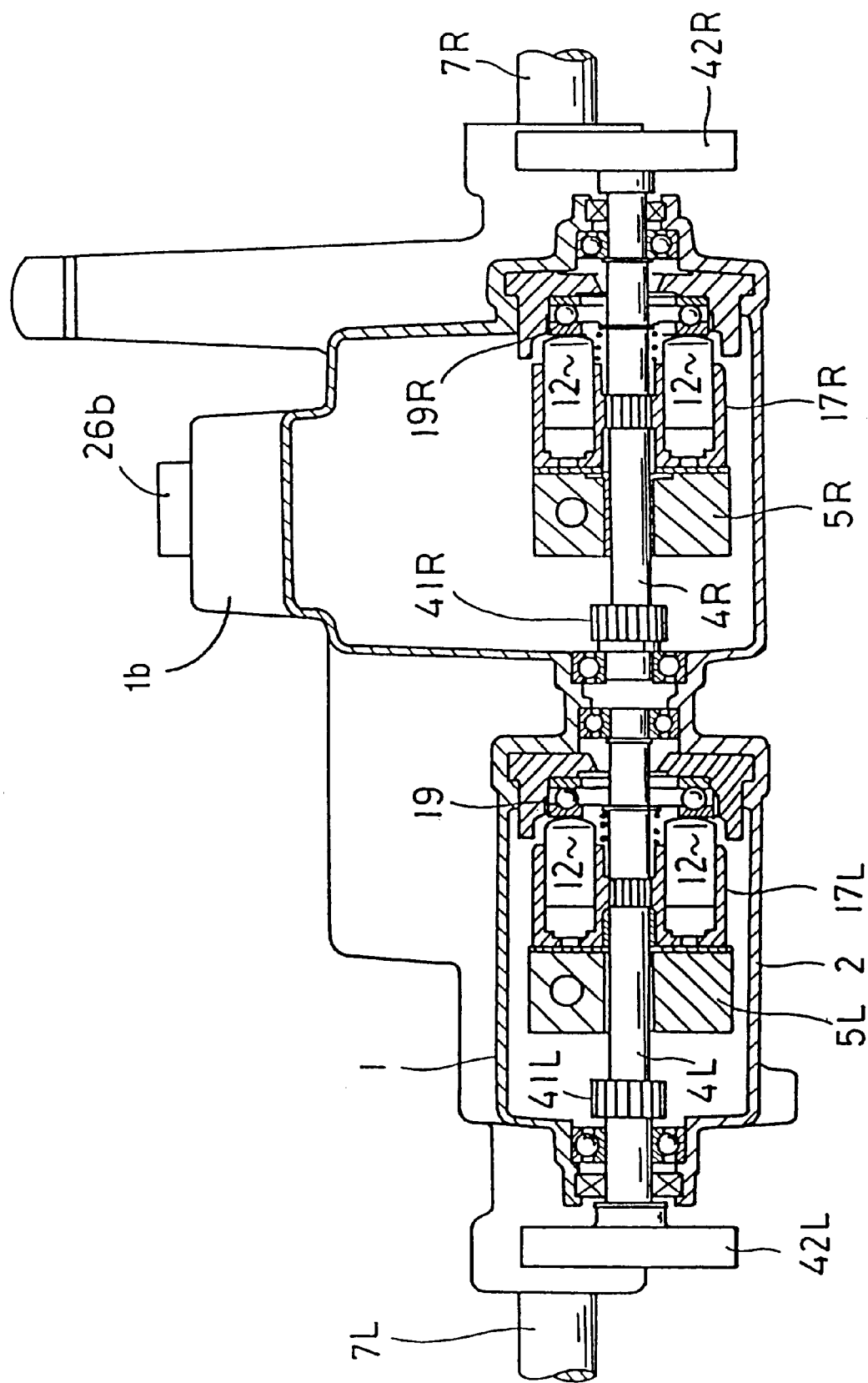
FIG. 33 is a cross sectional view taken along line 33—33 in FIG. 31.
Figure 34:
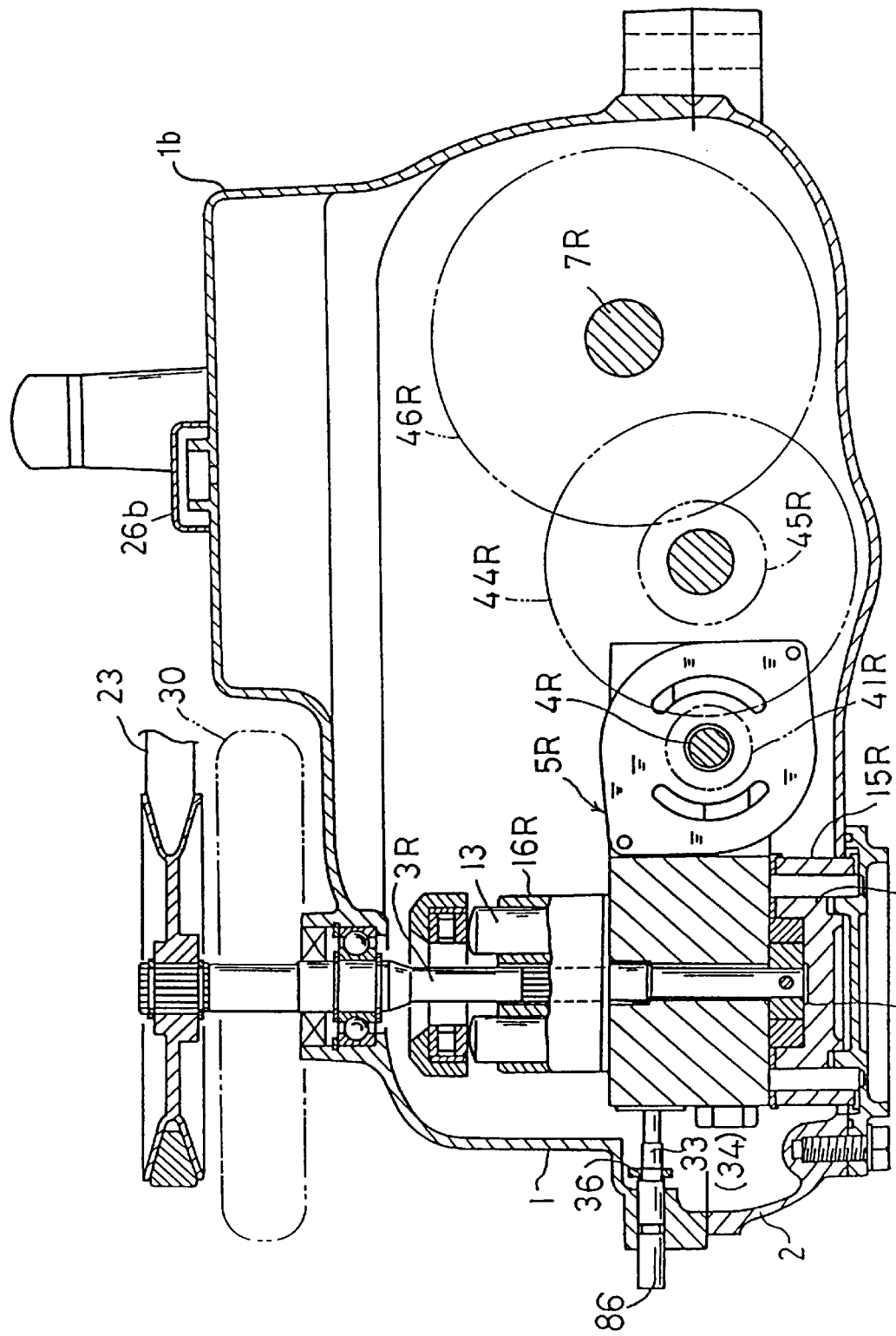
FIG. 34 is a cross sectional view taken along line 34—34 in FIG. 31.

As shown in FIG. 29, center sections 5L and 5R, each comprise an integrated combination of two substantially orthogonal plate-like portions 81 L and 82L, and 81R and 82R. In detail, each horizontal plate-like portion 81L and 81R has a flat surface that extends laterally. Each vertical plate-like portion 82L and 82R extends longitudinally and integrally from one side surface of center sections 5L and 5R. On the horizontal surfaces of plate-like portions 81L and 81R are pump mounting surfaces 5a for rotatably mounting thereon cylinder blocks 16L and 16R of hydraulic pumps PL and PR, respectively. On the vertical outside surfaces of plate-like portions 82L and 82R are motor mounting surfaces 5b for rotatably mounting thereon cylinder blocks 17L and 17R of hydraulic motors ML and MR, respectively.

Center sections 5L and 5R are disposed in the first portion of housing H laterally and substantially in parallel to each other and longitudinally of axles 7L and 7R. Center sections 5L and 5R are fixed to middle housing part 1 by three bolts. The axes of rotation of cylinder blocks 16L and 16R of hydraulic pumps PL and PR mounted on pump mounting surfaces 5a are substantially vertical and substantially in parallel to each other. The axes of rotation of cylinder blocks 17L and 17R of hydraulic motors ML and MR mounted on motor mounting surfaces 5b are substantially horizontal and are disposed on the same axis. The axes of rotation of hydraulic pumps PL and PR and the axes of rotation of hydraulic motors ML and MR are substantially perpendicular to each other. Hydraulic pumps PL and PR, and hydraulic motors ML and MR are disposed in a row and are substantially perpendicular to axles 7L and 7R. In other words, hydraulic pumps PL and PR and hydraulic motors ML and MR are overlapped with respect to axles 7L and 7R when viewed longitudinally.

Open kidney ports 5f communicating with the intake ports and discharge ports of cylinder blocks 16L and 16R, are disposed at pump mounting surfaces 5a of center sections 5L and 5R. Open kidney ports 5g communicating with the intake ports and discharge ports of cylinder blocks 17L and 17R, are disposed at motor mounting surfaces 5b of center sections 5L and 5R.

Within center sections 5L and 5R are a pair of oil passages 5d and 5e for mutually connecting kidney ports 5f of pump mounting surfaces 5a and kidney ports 5g of motor mounting surfaces 5b, thereby comprising closed fluid circuits. The closed fluid circuits are for circulating operating oil between hydraulic pumps PL and PR and hydraulic motors ML and MR, thereby forming hydraulic transmissions on left and right center sections 5L and 5R. Check valves 31 and 32, for supplying the operating oil, are interposed in oil passages 5d and 5e. The inlet ports of check valves 31 and 32 connect with one operating oil supply passage (not shown in FIG. 25–29) which is open at the lower surface of each center section 5L and 5R.

Charge pumps 11L and 11R is mounted on the bottom surface of center sections 5L and 5R, respectively, opposite to pump mounting surfaces 5a and are connected to the lower ends of pump shafts 3L and 3R, respectively, so as to be driven thereby. Filters 15L and 15R are provided at the opening ends of intake-side oil passages 10a in pump casings 10L and 10R, which contain charge pumps 11L and 11R, respectively. Pressurized oil discharged from charge pumps 11L and 11R flows from discharge-side oil passage 10b to operating oil supply passages to open the check valve at the low pressure side among both check valves 31 and 32, thereby allowing the oil in housing H to be taken into the closed fluid circuit.

Figure 25:
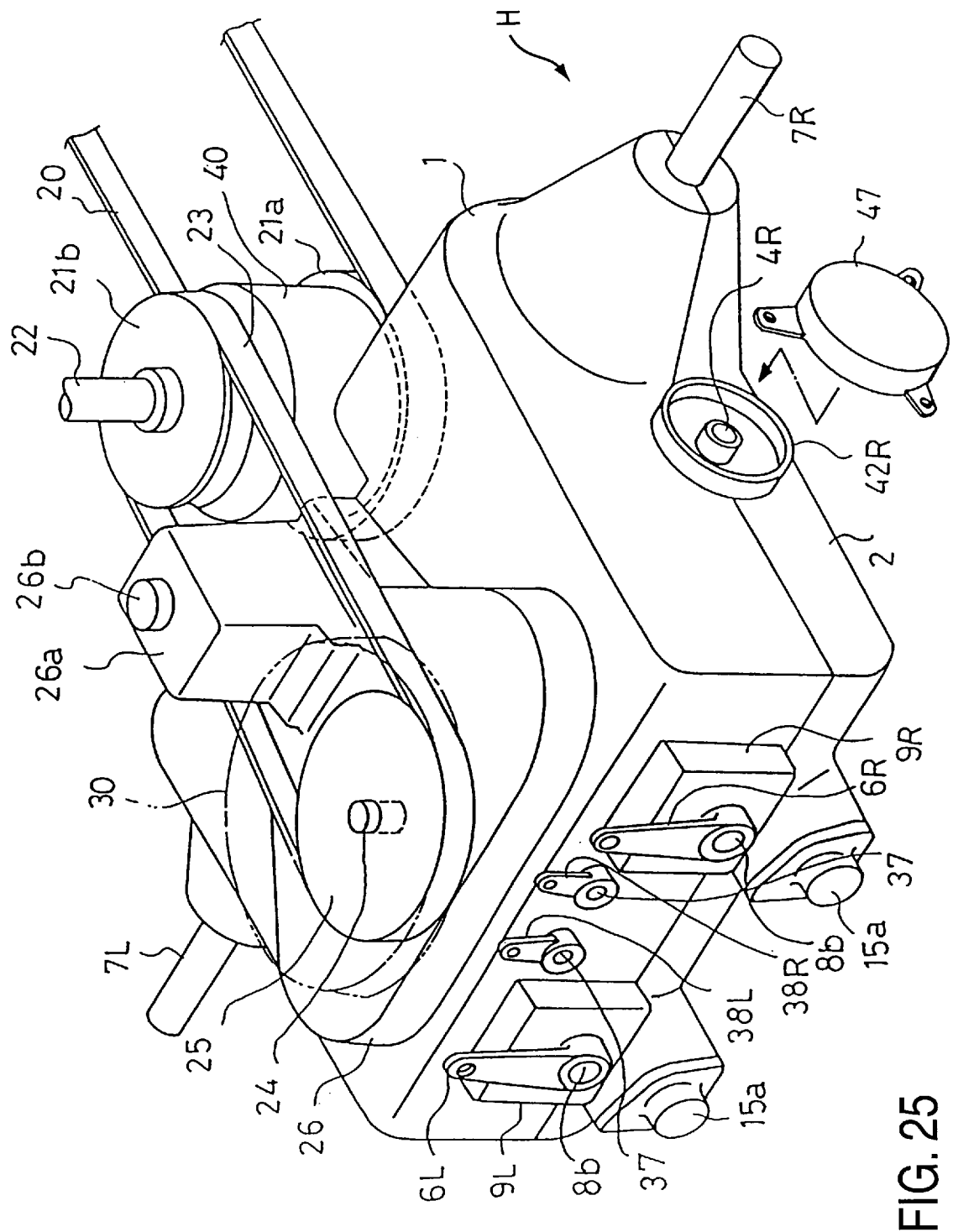
FIG. 25 is a perspective view of a fifth embodiment of the axle driving apparatus of the present invention.
Figure 26:
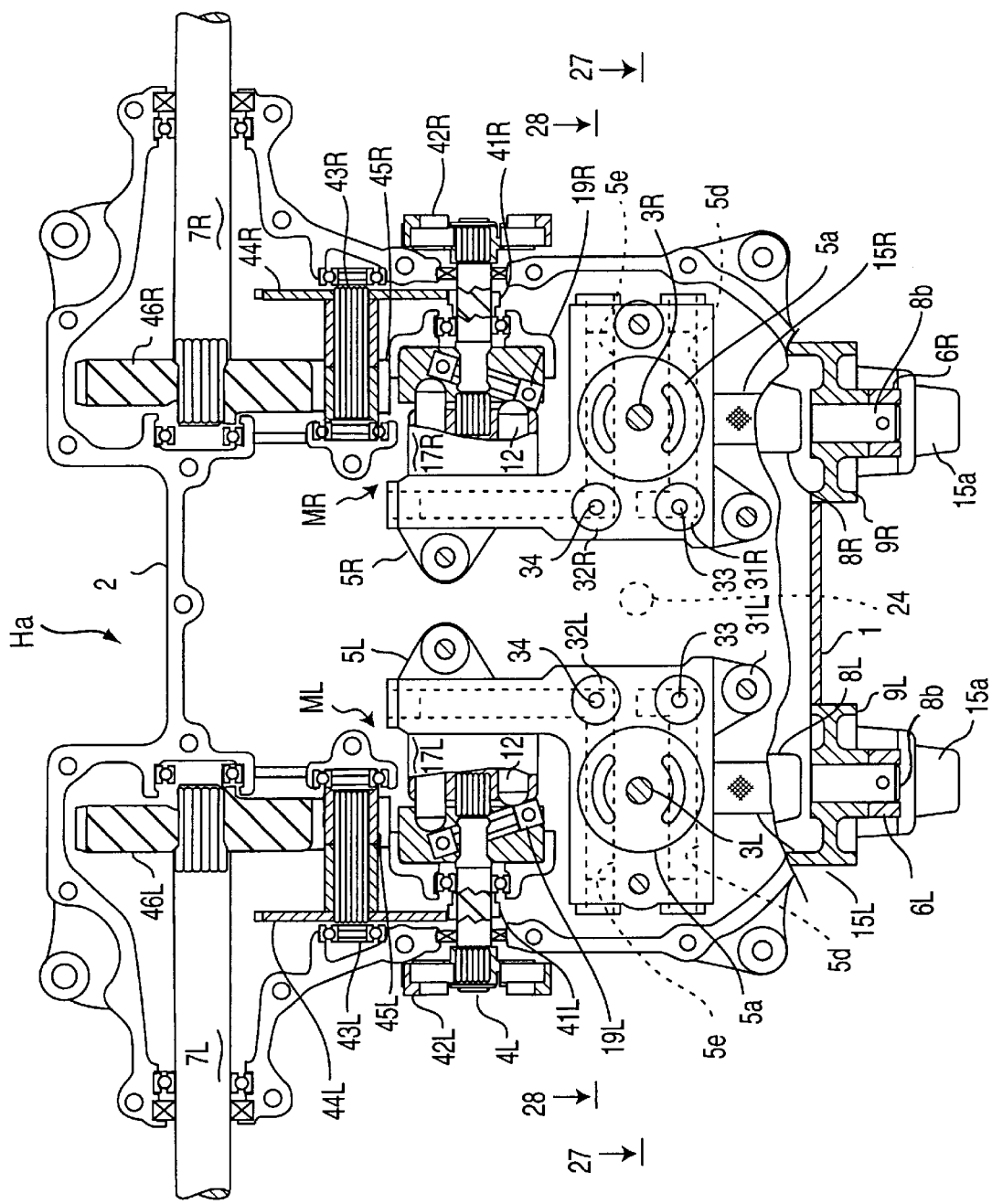
FIG. 26 is a plan view in partial cross section of the embodiment of FIG. 25, from which a middle part of the housing has been removed, showing an operating state when the vehicle is stopped.
Figure 27:
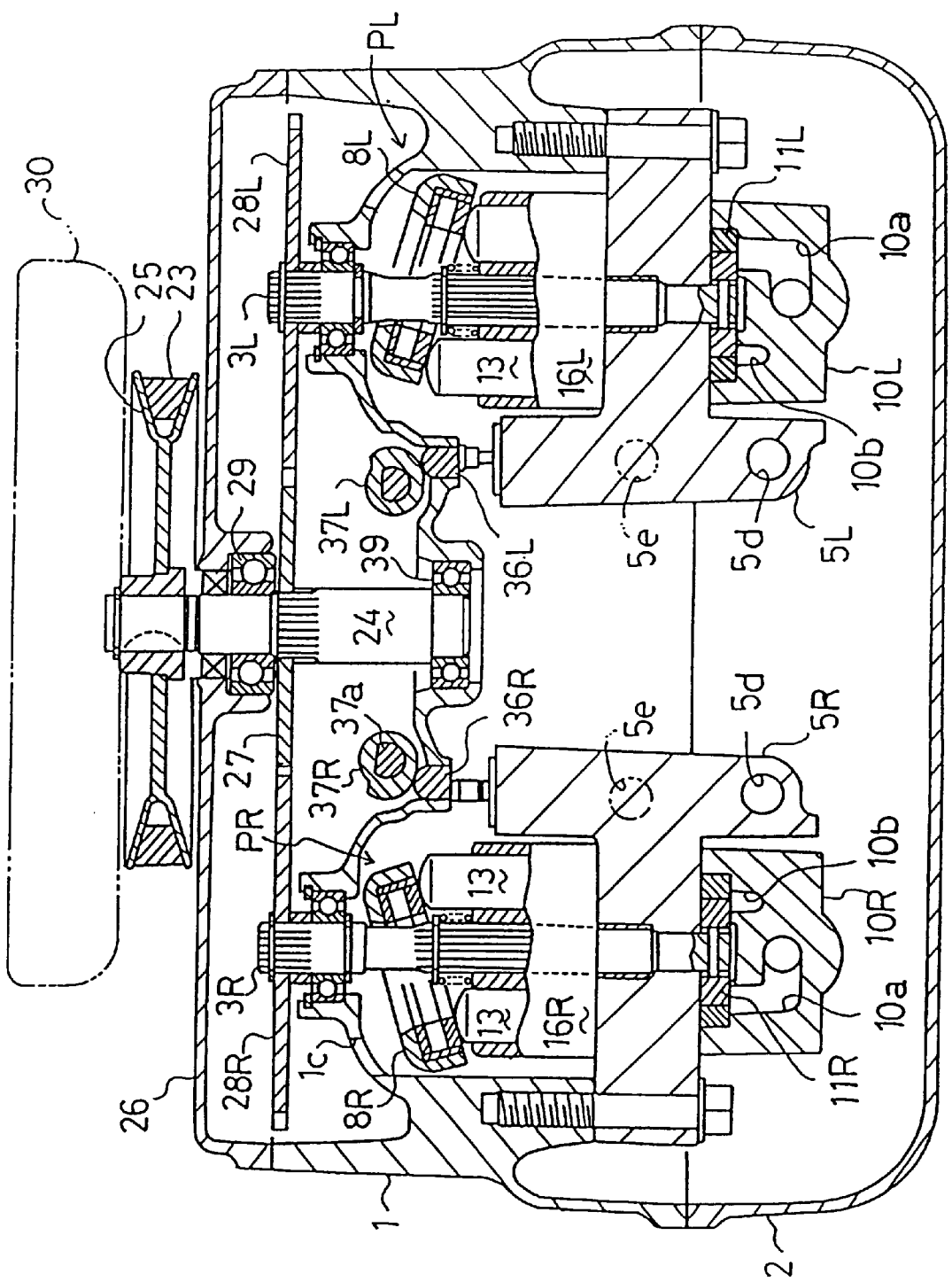
FIG. 27 is a cross sectional view taken along line 27—27 in FIG. 26.
Figure 28:
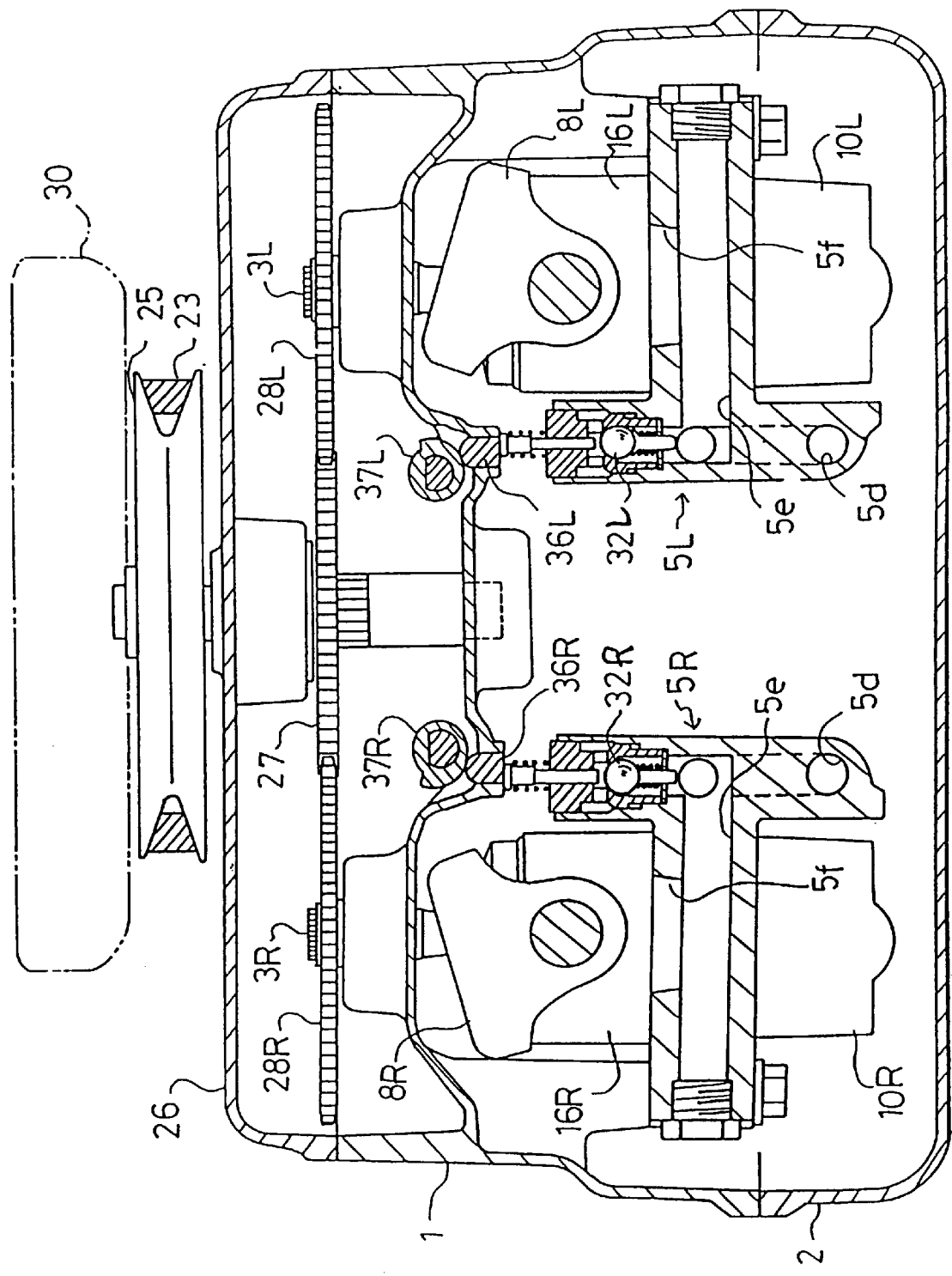
FIG. 28 is a cross sectional view taken along line 28—28 in FIG. 26.

Next, explanation will be given on the support construction of input shaft 24. As shown in FIG. 25, input shaft 24 is supported at its upper portion by bearing 29 held in upper housing part 26, which is the same as in the fourth embodiment described above. However, the lower portion of input shaft 24, which perforates middle housing part 1 and is supported by bearing 39 held in central portion 80 of center section 5 in the fourth embodiment, cannot be supported by such a construction in the fifth embodiment. This is because center sections 5L and 5R are separate from each other to allow for size reduction. Thus, the lower portion of input shaft 24 in the fifth embodiment is supported by bearing 39 which is disposed in a partition of middle housing part 1, as shown in FIG. 27.

Next, a sixth embodiment of the axle driving apparatus of the present invention will be discussed with reference to FIGS. 30–34. Again, components in housing H which are similar to those in the embodiments described above, are designated with the same reference numerals and are not generally discussed below.

Housing H in the sixth embodiment is constructed with a joint formed by joining upper housing half 1 and lower housing half 2 at flat joint surfaces, which are disposed around a periphery of upper housing half 1 and lower housing half 2. In the same plane as the flat joint surfaces of upper housing half 1 and lower housing half 2, are disposed the rotational axes of motor shafts 4L and 4R, and counter shafts 43L and 43R. The rotational axes of motor shafts 4L and 4R, and counter shafts 43L and 43R are disposed laterally and substantially in parallel to each other. This configuration simplifies the assembly of the axle driving apparatus. Axles 7L and 7R are rotatably supported in upper housing half 1. Motor shafts 4L and 4R, counter shafts 43L and 43R and axles 7L and 7R are disposed in the same axes, respectively.

Pump shafts 3L and 3R project vertically upwardly from upper housing half 1 and are supported at their upper portions by bearings provided in upper housing half 1. At the upper ends of pump shafts 3L and 3R are fixed input pulleys 25L and 25R, respectively, and cooling fans 30. A belt 23 is wound across pulley 21b on crank shaft 22 and input pulleys 25L and 25R. Belt 23 is tensioned by tension pulleys 84L and 84R which oppose each other. Tension pulleys 84L and 84R are pivotally supported by pivots 85L and 85R fixed to body frame 50. Part of the upper wall of upper housing half 1 is enlarged upwardly to form an expansion oil tank 1b. Breather 26b is attached thereto.

The lower ends of pump shafts 3L and 3R perforate through center sections 5L and 5R to connect with charge pumps 11L and 11R, respectively. Cylinder blocks 16L and 16R of hydraulic pumps PL and PR, respectively, are rotatably disposed on pump mounting surfaces 5a formed on the horizontal surfaces of plate-like portions 81L and 81R of center sections 5L and 5R. Cylinder blocks 17L and 17R of hydraulic motors ML and MR, respectively, are rotatably disposed on motor mounting surfaces formed on vertical side surfaces of plate-like portions 82L and 82R.

Center sections 5L and 5R are shaped similar to center sections 5 of the fifth embodiment, but are not laterally symmetrical. Similar components are juxtaposed in the same lateral direction. Hydraulic pumps PL and PR, and hydraulic motors ML and MR, each set of which has their axes of rotation perpendicular to and not intersecting with each other, are disposed in a row and at substantially right angles with respect to axles 7L and 7R. In other words, each hydraulic pump PL or PR and each hydraulic motor ML or MR are disposed to overlap with each other with respect to axles 7L and 7R when viewed longitudinally of housing H.

Charge pumps 11L and 11R are contained in pump casings 10 mounted to the bottom surfaces of center sections 5L and 5R, respectively. Intake-side oil passages of pump casings 10 are open at the bottom surfaces thereof. Discharge-side oil passages are connected with oil passages 5d and 5e of the closed fluid circuits in center sections 5L and 5R through operating oil supply passages open at the bottom surfaces of center sections 5L and 5R and for supplying the operating oil to check valves 31L, 32L, 31R and 32R. Check valves 31L, 32L, 31R and 32R are provided with push pins 33 and 34 for releasing oil from the respective closed fluid circuits. The extreme ends of pins 33 and 34 connect with urging plate 36. A push lever 86 projects from the center of urging plate 36 and outwardly projects from the rear surface of upper housing half 1.

The bottom surfaces of pump casings 10 come into close contact with openings at one end of annular filters 15L and 15R. Pump casings 10 and filters 15L and 15R are sandwiched by center sections 5L and 5R, and by covers 15a. The bottom wall of lower housing half 2 to which filters 15L and 15R are mounted, is open, and the openings are covered by covers 15a. Covers 15a are removable to enable filters 15L and 15R to be exchanged, repair or maintained.

Figure 35:
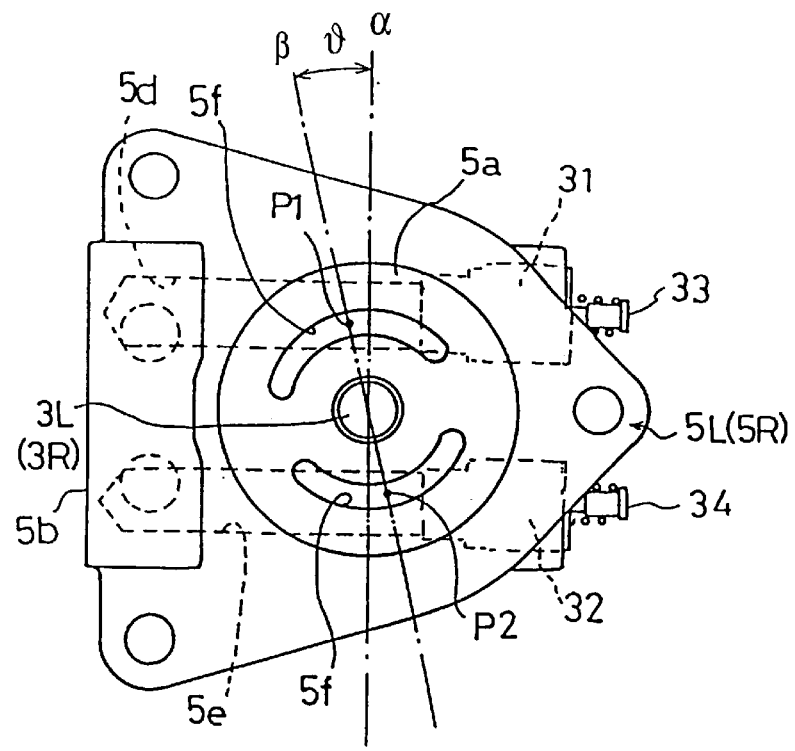
FIG. 35 is a plan view of the center section of the embodiment of FIG. 30 showing kidney ports on a pump attaching surface thereof.

Movable swash plates 8L and 8R of hydraulic pumps PL and PR in the hydrostatic transmission of the previously described six embodiments are constructed such that when cylinder blocks 16L and 16R of hydraulic pumps PL and PR rotate, swash plates 8L and 8R are rotated slantwise to a position other than neutral. For example, as shown in FIG. 35, a phantom line β which connects the centers of pressure P1 and P2 of the pair of kidney ports 5f at pump mounting surfaces 5a of center sections 5L and 5R is slanted by an angle θ with respect to the axis of rotation α of swash plates 8L and 8R. That is, the axis of rotation α of movable swash plates 8L and 8R are shifted by θ by a reaction force generated from pistons 13 acting on. movable swash plates 8L and 8R, whereby the slantwise rotational moment to a position other than neutral is adapted to be transferred to movable swash plates 8L and 8R.

Figure 36:
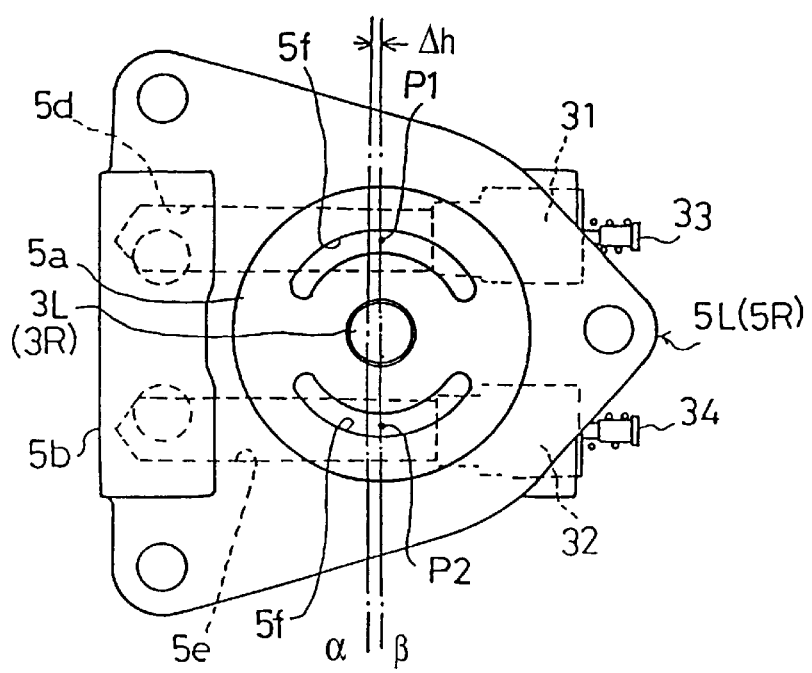
FIG. 36 is a plan view similar to FIG. 35 showing the relationship between the kidney ports and the center of the slanting movement of a movable swash plate.

A modified embodiment of the axle driving apparatus of the present invention is shown in FIG. 36. In this embodiment, the slantwise rotational moment to a position other than neutral is transferred to movable swash plates 8L and 8R. This modified embodiment is configured such that the slantwise rotational center line α of each movable swash plate 8L or 8R is made parallel to and offset only by a length Δh with respect to phantom line β, which connects the center of pressures P1 and P2 of each kidney port 5f.

Figure 38:
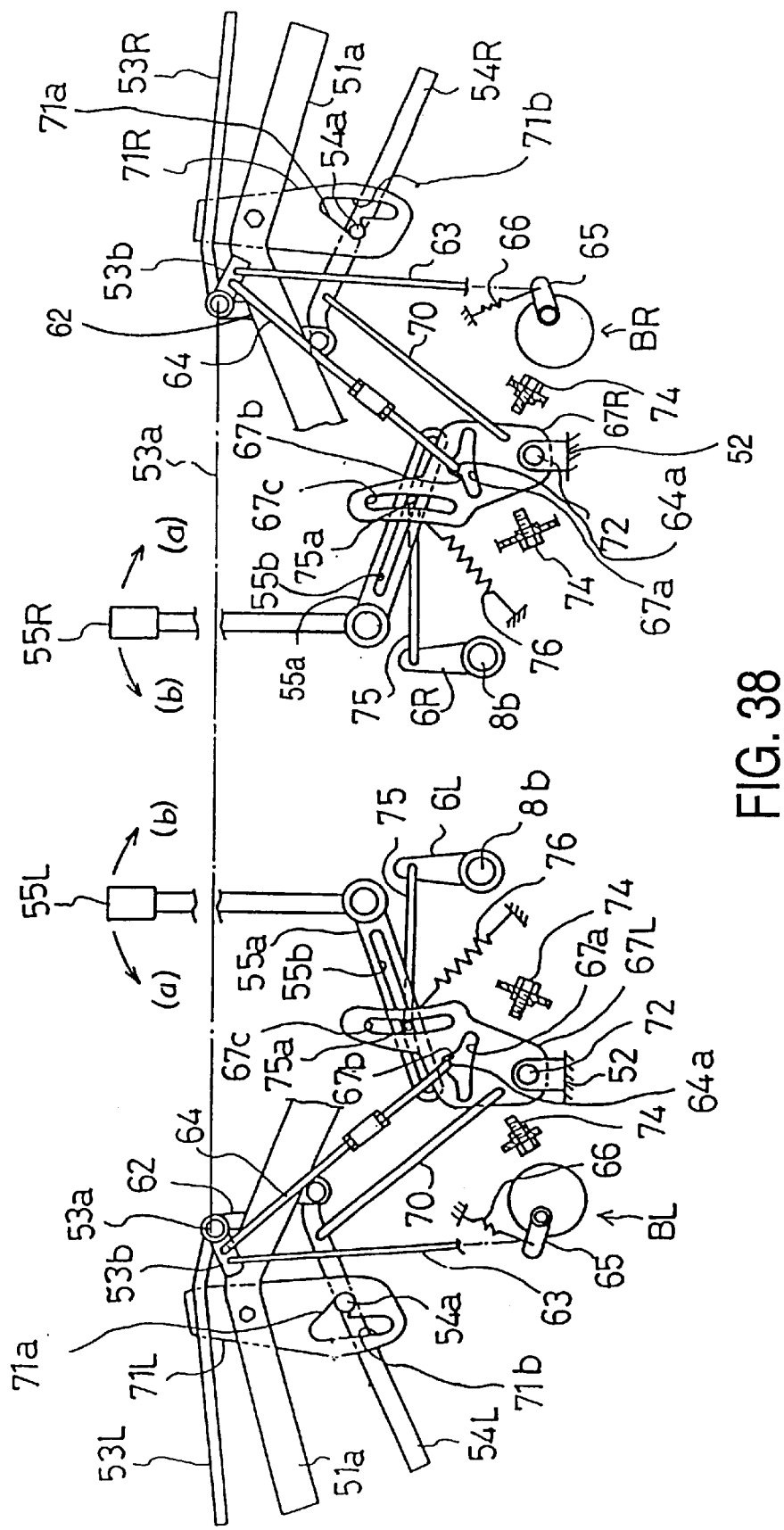
FIG. 38 is a schematic view of a steering unit of the present invention.
Figure 39:
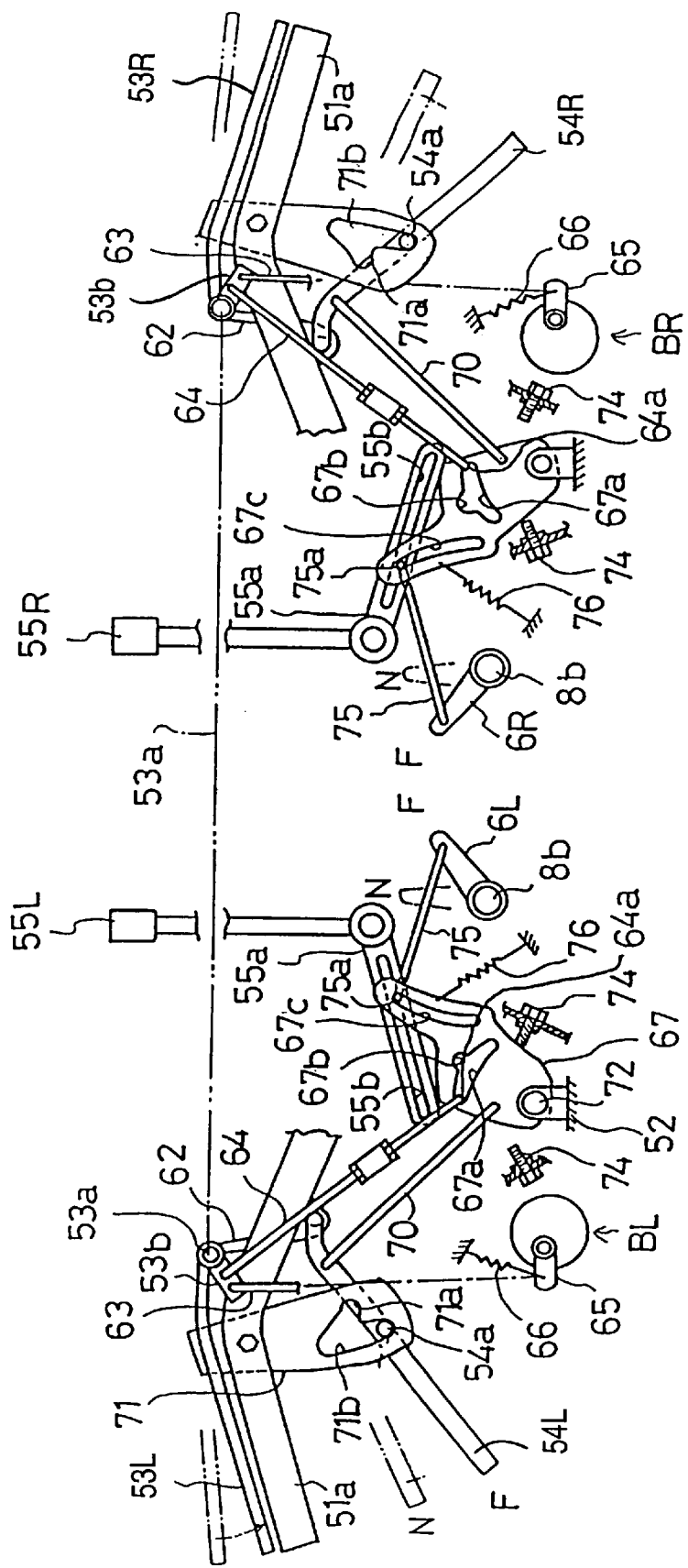
FIG. 39 is a schematic view similar to FIG. 38, showing the operating state when the vehicle is travelling in a straight forward direction.
Figure 40:
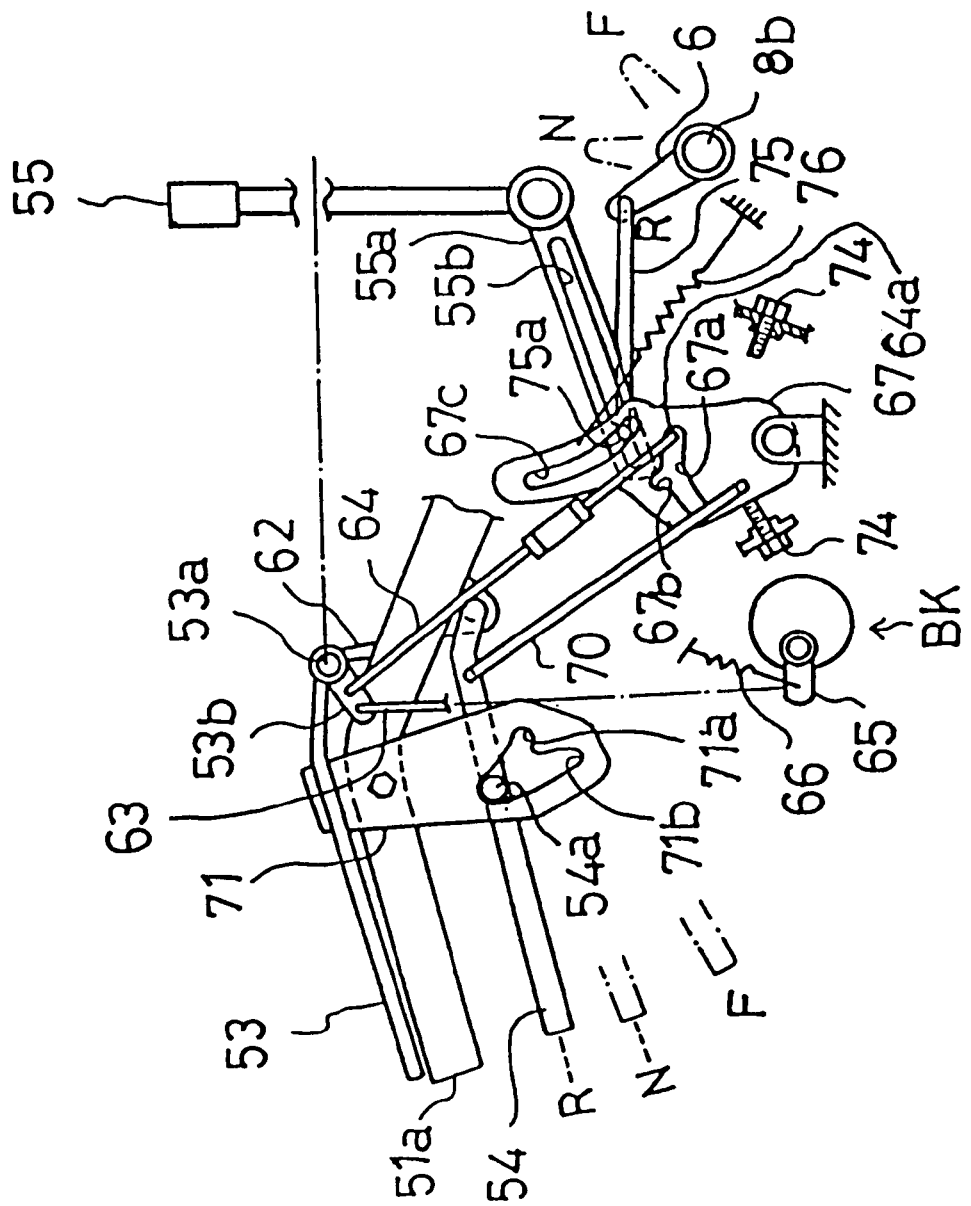
FIG. 40 is a schematic view similar to FIG. 38 showing the operating state when the vehicle is turning.

Referring now to FIGS. 38, 39 and 40, a steering device of the present invention is shown for forwardly moving, stopping, backwardly moving or turning a vehicle having the axle driving apparatus of the present invention mounted thereon. Deadman levers 53L and 53R are disposed to be gripped from above grips 51a. Connecting shafts 53a and 53b pivotally connect deadman levers 53L and 53R to the base of grips 51a by stays 62. Stays 62 are fixed to both ends of connecting shafts 53a and 53b and each one end of a brake link 63. A link 64 is connected to stay 62. The other end of each brake link 63 is connected to a brake lever 65 at each brake device BL or BR. Brake levers 65 are biased by springs 66 in the direction of operating brake devices BL and BR. The other ends of links 64 are pivotally connected to and moveable within first elongate bores 67a on interlock plates 67L and 67R.

Steering levers 54L and 54R are pivotally supported at the front ends thereof to the lower portion of the bases of grips 51a in a manner that the front ends can be gripped together with grips 51a. Each link 70 is pivotally supported at one end adjacent the front ends of steering levers 54L or 54R, the other end is connected to interlock plates 67L and 67R, respectively.

Next, the interlock mechanism and its operation will be discussed. Interlock plates 67L and 67R are pivotally connected to pivots 72 on operating box 52. The range of rotation of interlock plates 67L and 67R is regulated by position-adjustable stoppers 74. First elongate bores 67a are provided in plates 67L and 67R, each having a circular arc shape and each having a recess 67b substantially in its middle contiguous with the circular arch shape. When deadman levers 53L and 53R are firmly gripped, links 64 are pushed down, and pivotal support portions 64a are set to be positioned in the circular-arc portion of first elongate bores 67a, whereby interlock plates 67L and 67R can freely swing. When deadman levers 53L and 53R are not gripped, links 64 are pushed up by springs 66, so that pivotal support portions 64a are set to be positioned in recesses 67b of first elongate bores 67a, whereby inter-lock plates 67L and 67R are stopped in recesses 67b and cannot swing. The positions where interlock plates 67L and 67R are stopped, correspond to the neutral positions of speed change levers 6L and 6R, discussed below.

Interlock plates 67L and 67R are further provided with second elongate bores 67c. Each rod 75 is connected to a speed change lever 6L and 6R and is movably and pivotally engaged with bores 67c. Control linkage means are comprised between left and right steering levers 54L and 54R, and speed change levers 6L and 6R, respectively.

Each control lever 55L and 55R is provided at operating box 52 with an arm 55a integral with the rotary pivotal support portions. Second elongate bores 67c are each shaped as a circular arc. A pivotally engaging portion 75a of link 75 is inserted into each second elongate bore 67c and is also positioned in a straight slot 55b in each arm 55a. Accordingly, when control levers 55L and 55R are moved in direction (a) or direction (b) to shift arms 55a, the connecting positions of pivotally engaging portions 75a of links 75 with respect to interlock plates 67L and 67R are changed in a stepless manner.

With this construction, an operation ratio for each speed change lever 6L or 6R with respect to that of each steering lever 54L or 54R, that is, the link ratio, is changed. For example, when pivotally engaging portion 75a of each link 75 is positioned in the upper portion of second elongate shot 67c, the link ratio becomes larger, so that, even when steering levers 54L and 54R are lightly gripped, speed change levers 6L and 6R experience a large degree of movement. On the other hand, when each pivotally engaging portion 75a is positioned in the lower portion of second slot 67c, the link ratio is reduced, whereby speed change levers 6L and 6R are slightly and precisely moved corresponding to the degree of gripping imposed on steering levers 54L and 54R.

Springs 76 are provided in operating box 52. Springs 76 have a tensile strength sufficient to create a spring bias mechanism. One end of each spring 76 is connected to one side of operating box 52. The other end of each spring 76 is connected to each interlock plate 67L or 67R which is permanently biased by springs 76 in the direction of moving each speed change lever 6L or 6R toward the forward travelling, maximum speed position F as shown in phantom in FIG. 40.

Figure 37:
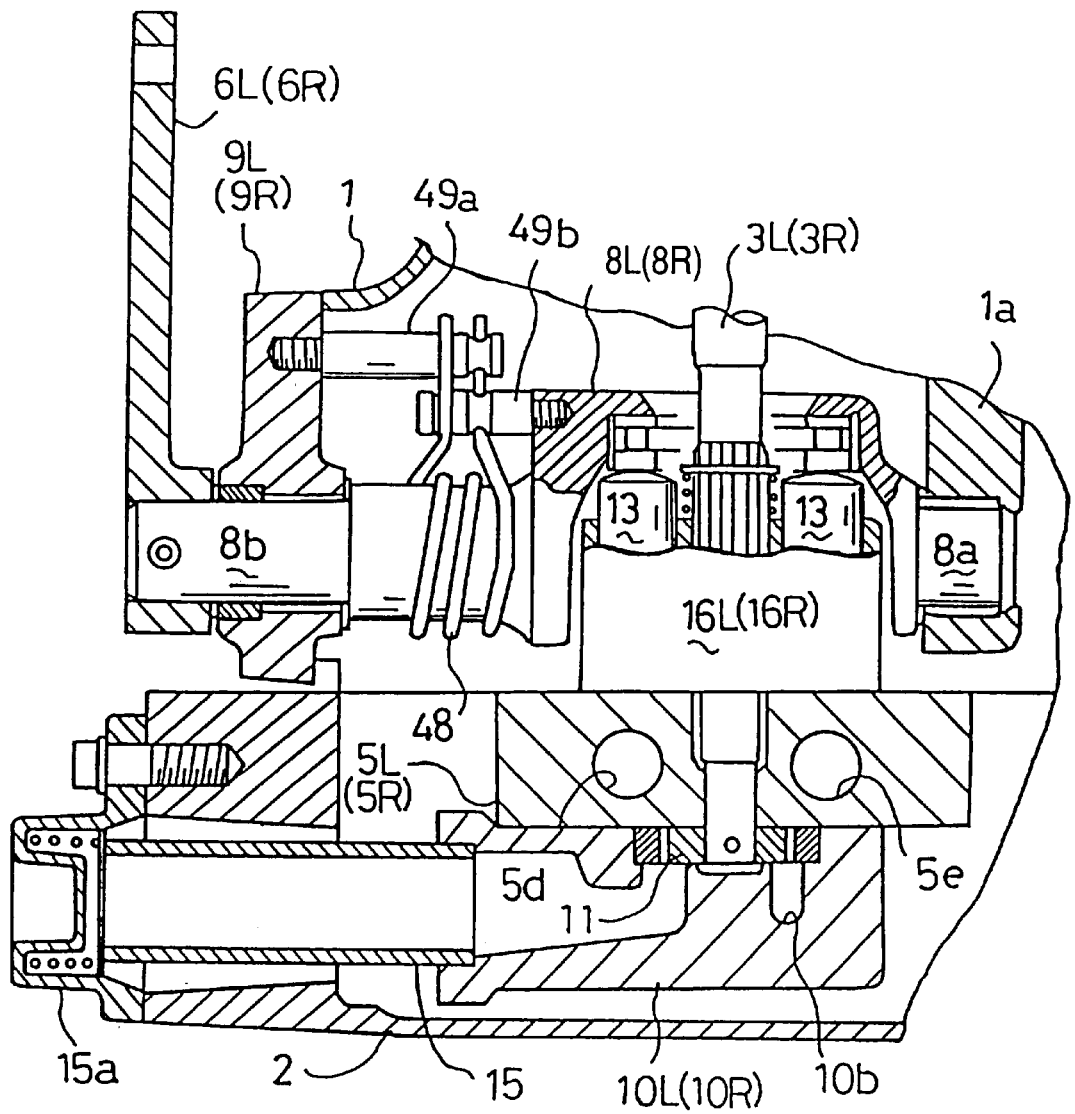
FIG. 37 is an enlarged cross sectional side view of a principal portion of the hydraulic transmission of the embodiment of FIG. 30 in the vicinity of the movable swash plate.

The spring bias mechanism, as shown in FIG. 37, may be provided within housing H of the axle driving apparatus. In particular, a torque spring 48 is disposed onto shaft 8b of each movable swash plate 8L or 8R. Between both ends of torque spring 48 is positioned a fixed pin 49a provided on each support plate 9L and 9R and a movable pin 49b provided on each movable swash plate 8L and 8R. This construction, which disposes the spring bias mechanism within the housing H, maintains springs 76 at peak performance for a long period time without being affected by dust or rust.

In addition, steering lever lock plates 71L and 71R are provided at the base side of grips 51a of handles 51. Steering lever lock plates 71L and 71R are each provided with a lock groove 71a and an unlock groove 71b, which comprise a bifurcated contiguous groove. A pin 54a on each steering lever 54L and 54R is insertable into these bifurcated contiguous grooves. The operator can operate steering plates 71L and 71R to change the posture thereof. In particular, when the vehicle is intended to stop, as shown in FIG. 38, each pin 54a is positioned in lock groove 71a. Thus, each steering lever 54L and 54R is stopped at the neutral position so as not to firmly grip each lever 54L or 54R. When the vehicle starts, pin 54a is positioned in unlock groove 71b. Thus, each steering lever 54L and 54R is biased by the spring bias mechanism to be automatically pressed down to the lowermost position or the forward travel side maximum speed position F at the unlock groove 71n, whereby the operator can freely grip each steering lever 54L or 54R from position F.

In FIG. 38, the operator does not firmly grip either one of deadman levers 53L and 53R and steering levers 54L and 54R. Therefore, deadman levers 53 are raised by springs 66 and both braking devices BL and BR are in the operating state of braking axles 7L and 7R, respectively. Pivotally engaging portion 64a of each link 64 is positioned in recess 67b of first elongate slot 67a to hold each speed change lever 6L or 6R in a neutral position N (see FIG. 39) so as to brake each axle 7L or 7R. In brief, when the operator releases deadman levers 53L and 53R, the pair of left and right hydraulic stepless transmissions and left and right braking devices BL and BR are not operating, thereby enabling the vehicle to be instantly stopped so as to prevent the vehicle from running away.

When deadman levers 53L and 53R are gripped as shown in FIG. 39, the vehicle is put in the straight traveling state. In other words, when deadman levers 53L and 53R are pressed downwardly, arms 53b push links 64. When pivotally engaging portions 64a are disengaged from recesses 67b and are positioned in the circular-arc portions, interlock plates 67L and 67R are released from this fixed state and are simultaneously and forcibly slanted to one side. Hence, links 70 are pulled to automatically press down steering levers 54L and 54R to the lower most position. Links 75 are pushed to automatically move speed change levers 6L and 6R to the forward travelling, maximum speed positions. Arms 53b press down links 63 against the biasing force of springs 66 to release the axle braking state of braking devices BL and BR, whereby axles 7L and 7R rotate at maximum speed toward in the direction of forward travel of the vehicle.

In order to turn the vehicle from the above-mentioned straight traveling state, the lever on the turning side among steering levers 54L and 54R may be firmly gripped. For example, if the vehicle is to be turned to the left, the left steering lever 54L is firmly gripped. When the left steering lever 54L is firmly gripped, link 70 is raised and interlock plate 67L is reversibly rotated against spring 76, whereby link 75 is pulled, so that speed change lever 6L is operated toward the speed reduction side. The number of rotations of axle 7L is lower than that of axle 7R and the vehicle turns to the left. When the left steering lever 54L is gripped as much as possible, as shown in FIG. 40, speed change lever 6L is turned to the backward traveling, maximum speed position R and axles 7L leads to the maximum rotation in the right reverse direction with respect to the axle 7R, resulting in that the vehicle experiencing no turn at all.

In addition, when firmly gripping steering levers 54L and 54R, resistance of spring 76 results and movable swash plates 8L and 8R of hydraulic pump PL and PR experience slantwise rotational moment to the other than neural position, thereby it is unnecessary to have each spring 76 have a large biasing force. Accordingly, the operator can firmly grip steering levers 54L and 54R with a light operating force.

In a case that the left and right drive wheels do not equally rotate due to the state of the surface on which the vehicle is running, left and right speed control levers 55L and 55R can be operated accordingly in the direction (a) or (b), so that speed change levers 6L and 6R are adjusted in positions so as to correct the traveling direction of the vehicle to straight forward travel. If the operator of the vehicle happens to fall so as to release his hands from grips 51a, braking devices BL and BR operate to brake axles 7L and 7R, and simultaneously, the interlock mechanism (discussed above) operates to forcibly return speed change levers 6L and 6R to the neutral position N, thereby quickly stopping the vehicle.

The axle driving apparatus of the present invention is widely applicable not only to the walk behind mower shown in the drawings, but also to various kinds of self running work machines of the walk behind type, such as a snow removing vehicle or a power transport car, and a self propelled vehicle such as a riding lawn mower or a vehicle having a zero turn radius.

Although several embodiments of the present invention have been described, they are merely exemplary of the invention and not to be constructed as limiting, the invention being defined solely by the appended claims.

What is claimed is:

1. An axle driving apparatus, comprising:
   a housing including at least two housing parts coupled with each other through a substantially horizontal plane;
   first and second axles laterally disposed in said housing, either in said horizontal plane or in parallel to said horizontal plane;
   a first hydrostatic transmission including a first output shaft disposed within said housing;
   a second hydrostatic transmission including a second output shaft disposed within said housing;
   a power input means having a substantially vertical axis of rotation, said power input means supplying power from a prime mover to said first and second hydrostatic transmissions;
   a first power transmitting means disposed in said housing for transmitting power from said first output shaft and to said first axle; and
   a second power transmitting means disposed in said housing for transmitting power from said second output shaft to said second axle.

2. An axle driving apparatus according to claim 1, wherein said power input means comprises an input pulley disposed outside said housing in common to simultaneously drive said first and second hydrostatic transmission.

3. An axle driving apparatus according to claim 1, further comprising:
   a first gear train for transmitting power from said input pulley to said first hydraulic transmission, disposed within said housing; and
   a second gear train for transmitting power from said input pulley to said hydraulic transmission, disposed within said housing.

4. An axle driving apparatus according to claim 1, wherein said power input means comprises an input pulley disposed outside said housing which includes a plurality of said input pulleys for individually driving said first and second hydrostatic transmissions.

5. An axle driving apparatus according to claim 1, wherein said first and second hydrostatic transmissions each comprises:
   a hydraulic motor having a motor shaft;
   wherein said first and second hydrostatic transmission having motor shafts respectively, said first and second power transmitting means each includes;
   a counter shaft disposed between said motor shaft and one of said axles; and
   a gear train for coupling said motor shaft to one of said axles through said counter shaft.

6. An axle driving apparatus according to claim 5, wherein said counter shafts are positioned in a plane in common with joint surfaces of said housing parts.

7. An axle driving apparatus according to claim 1, wherein substantially all of the elements contained in said housing are laterally symmetrically disposed at opposite sides of a plane positioned substantially at the center of said housing and orthogonal to said first and second axles.

8. An axle driving apparatus according to claim 5, further comprising:
   a braking device provided for each of said motor shafts.

9. An axle driving apparatus, comprising:

a housing;

first and second axles laterally disposed in said housing;

a first hydrostatic transmission disposed in said housing and including a first hydraulic pump having a first pump shaft and a first hydraulic motor having a first motor shaft;

a second hydrostatic transmission disposed in said housing and including a second hydraulic pump having a second pump shaft and a second hydraulic motor having a second motor shaft;

a power input shaft supported by said housing having a substantially vertical axis of rotation for drivingly coupling with and in common to each of said first and second pump shafts;

a first power transmitting means disposed in said housing for transmitting power from said first motor shaft to said first axle; and a second power transmitting means disposed in said housing for transmitting power from said second motor shaft to said second axle.

10. An axle driving apparatus according to claim 9, further comprising:

a first gear train for drivingly connecting said input shaft and said first pump shaft; and a second gear train for drivingly connecting said input shaft and said second pump shaft.

11. An axle driving apparatus according to claim 9, wherein each of said first and second pump shafts has an axis of rotation which are substantially parallel to each other with respect to the axis of rotation of said power input shaft.

12. An axle driving apparatus according to claim 9, wherein said housing includes at least two housing parts coupled with each other through a substantially horizontal plane wherein said axes of rotation of said first and second axles are either disposed in said horizontal plane or are disposed in parallel to said plane.

13. An axle driving apparatus according to claim 10, wherein said housing comprises a plurality of housing parts joined with each other through a substantially orthogonal plane with respect to the axis of rotation of said power input shaft and whereby said first and second gear trains are contained in two housing parts which overlap with each other.

14. An axle driving apparatus according to claim 9, wherein said first hydrostatic transmission is disposed at one lateral side in said housing, said second hydraulic pump is disposed at the other lateral side of said housing, and said power input shaft is disposed at substantially the center of said housing.

15. An axle driving apparatus according to claim 9, wherein substantially all of the elements contained in said housing are laterally symmetrically disposed at opposite sides of a plane positioned substantially at the center of said housing and orthogonal to said first and second axles.

16. An axle driving apparatus, comprising:

a housing;

first and second axles laterally disposed in said housing;

a first hydrostatic transmission disposed in said housing and including a first hydraulic pump having a first pump shaft and a first hydraulic motor having a first motor shaft;

a second hydrostatic transmission disposed in said housing and including a second hydraulic pump having a second pump shaft and a second hydraulic motor having a second motor shaft;

a power input means having a substantially vertical axis of rotation, said power input means including an input pulley disposed outside said housing for simultaneously driving each of said first and second pump shafts;

a first power transmitting means disposed in said housing for transmitting power from said first motor shaft to said first axle; and a second power transmitting means disposed in said housing for transmitting power from said second motor shaft to said second axle.

17. An axle driving apparatus according to claim 16, wherein said power input means includes:

an input shaft extending along the axis of rotation of said input pulley;

a first gear train for drivingly connecting said input shaft and said first pump shaft; and a second gear train for drivingly connecting said input shaft and said second pump shaft.

18. An axle driving apparatus according to claim 16, wherein each of said first and second pump shafts has an axis of rotation which is substantially parallel to each other with respect to the axis of rotation of said input pulley and extend vertically.

19. An axle driving apparatus according to claim 18, wherein said housing comprises a plurality of housing parts joined with each other through a substantially orthogonal plane with respect to the axis of rotation of said input pulley and whereby said first and second gear trains are contained in two housing parts which overlap with each other.

20. An axle driving apparatus according to claim 16, wherein said first hydraulic pump is disposed at one lateral side in said housing, said second hydraulic pump is disposed at another lateral side of said housing, and said input shaft is disposed at substantially the center of said housing.

21. An axle driving apparatus according to claim 20, further comprising:

a first center section for disposing thereon said first hydraulic pump mounted within said housing at one lateral side thereof; and a second center section for disposing thereon said second hydraulic pump mounted within said housing at another lateral side thereof.

22. An axle driving apparatus according to claim 20, further comprising a center section for disposing thereon both said first and said second hydraulic pumps disposed in said housing.

* * * * *